US012715277B1

(12) United States Patent
Wires et al.

(10) Patent No.: US 12,715,277 B1
(45) Date of Patent: Aug. 25, 2026

(54) LAND VEHICLES INCORPORATING CRADLES FOR SUPPORTING ELECTRICAL DEVICES AND COMPONENTS THEREFOR

(71) Applicant: Workhorse Group Inc., Sharonville, OH (US)

(72) Inventors: Donald L. Wires, Loveland, OH (US); Max Lupfer, Sharonville, OH (US); Ryan Doll, Sharonville, OH (US)

(73) Assignee: Workhorse Group Inc., Sharonville, OH (US)

( * ) Notice: Subject to any disclaimer, the term of this patent is extended or adjusted under 35 U.S.C. 154(b) by 0 days.

(21) Appl. No.: 19/365,002

(22) Filed: Oct. 21, 2025

Related U.S. Application Data

(63) Continuation of application No. 19/065,998, filed on Feb. 27, 2025, now Pat. No. 12,472,807.

(51) Int. Cl.
*B60K 1/04* (2019.01)
*B62D 21/06* (2006.01)

(52) U.S. Cl.
CPC ................ *B60K 1/04* (2013.01); *B62D 21/06* (2013.01); *B60K 2001/0438* (2013.01)

(58) Field of Classification Search
CPC ... B60K 1/04; B60K 2001/0438; B62D 21/06
See application file for complete search history.

(56) References Cited

U.S. PATENT DOCUMENTS 1,251,749 A 1/1918 Cilley
1,728,889 A 9/1929 Kemble
2,172,831 A 9/1939 Philip
2,728,420 A 12/1955 Wright et al.
2,973,220 A 2/1961 White
3,066,621 A 12/1962 Dean et al.
3,696,732 A 10/1972 Rodgers
4,159,832 A 7/1979 Inbody
4,270,622 A 6/1981 Travis
4,676,545 A 6/1987 Bonfilio et al.
(Continued)

FOREIGN PATENT DOCUMENTS

CN 103359174 A 10/2013
CN 109515094 A 3/2019
(Continued)

OTHER PUBLICATIONS

International Search Report; International Searching Authority; International Patent Application No. PCT/US2021/012327; Mar. 9, 2021; 2 pages.

(Continued)

*Primary Examiner* — Marc Q Jimenez
*Assistant Examiner* — James J Triggs
(74) *Attorney, Agent, or Firm* — Taft Stettinius & Hollister LLP

(57) ABSTRACT

Land vehicles are disclosed. A land vehicle includes a chassis extending in a longitudinal direction and a plurality of wheels supported by the chassis including a pair of front wheels and a pair of rear wheels arranged rearward of the pair of front wheels in the longitudinal direction. The chassis includes a power source cradle assembly supporting a plurality of power sources of the vehicle that is arranged between the pair of front wheels and the pair of rear wheels in the longitudinal direction.

17 Claims, 18 Drawing Sheets

(56) References Cited

U.S. PATENT DOCUMENTS

| | | | | |
|---|---|---|---|---|
| 4,934,733 | A | 6/1990 | Smith et al. | |
| 5,168,963 | A | 12/1992 | Poncini | |
| 5,363,939 | A | 11/1994 | Catlin | |
| 5,363,969 | A | 11/1994 | Shen | |
| 5,628,438 | A | 5/1997 | Legrow | |
| 5,690,378 | A | 11/1997 | Romesburg | |
| 5,823,599 | A | 10/1998 | Gray | |
| 5,829,542 | A | 11/1998 | Lutz | |
| 6,015,198 | A | 1/2000 | Stair | |
| 6,357,769 | B1 | 3/2002 | Omundson et al. | |
| 6,893,046 | B2 | 5/2005 | Ledesma et al. | |
| 6,926,351 | B2 | 8/2005 | Telehowski et al. | |
| 6,954,152 | B1 | 10/2005 | Matthews | |
| 7,441,809 | B1 | 10/2008 | Coombs et al. | |
| 7,651,153 | B2 | 1/2010 | Martin et al. | |
| 8,002,063 | B2 | 8/2011 | Rydberg et al. | |
| 8,641,133 | B1 | 2/2014 | Scaringe et al. | |
| 8,651,292 | B2 | 2/2014 | Sunderland et al. | |
| 8,714,592 | B1 | 5/2014 | Thoreson et al. | |
| 9,103,535 | B1 | 8/2015 | Strobel et al. | |
| 9,168,818 | B2 | 10/2015 | Hirai et al. | |
| 9,550,414 | B2 | 1/2017 | Kudo et al. | |
| 10,518,627 | B2 | 12/2019 | Nagpal et al. | |
| 10,801,169 | B2 | 10/2020 | Roy et al. | |
| 10,967,904 | B2 | 4/2021 | Penz et al. | |
| 11,766,925 | B2 | 9/2023 | Landvik et al. | |
| 11,801,741 | B2 | 10/2023 | Zandbergen et al. | |
| 12,168,489 | B2 | 12/2024 | Choi | |
| 12,269,538 | B2 * | 4/2025 | Roche | B60K 17/22 |
| 12,466,485 | B1 | 11/2025 | Wires et al. | |
| 12,472,807 | B1 | 11/2025 | Wires et al. | |
| 2002/0113394 | A1 | 8/2002 | Ziech et al. | |
| 2004/0046381 | A1 | 3/2004 | Yoshida et al. | |
| 2004/0118643 | A1 | 6/2004 | Booher | |
| 2006/0158024 | A1 | 7/2006 | Wendl | |
| 2006/0273571 | A1 | 12/2006 | Matsumoto et al. | |
| 2007/0257570 | A1 | 11/2007 | Walter et al. | |
| 2008/0003321 | A1 | 1/2008 | Kerr et al. | |
| 2009/0032321 | A1 | 2/2009 | Marsh et al. | |
| 2010/0025132 | A1 | 2/2010 | Hill et al. | |
| 2010/0072787 | A1 | 3/2010 | Abe et al. | |
| 2010/0101900 | A1 | 4/2010 | Usui | |
| 2010/0108417 | A1 | 5/2010 | Gilmore | |
| 2010/0263954 | A1 | 10/2010 | Constans | |
| 2011/0017527 | A1 | 1/2011 | Oriel et al. | |
| 2012/0103713 | A1 | 5/2012 | Ohashi | |
| 2013/0153343 | A1 | 6/2013 | Neudeck | |
| 2013/0241237 | A1 | 9/2013 | Dziuba et al. | |
| 2013/0341971 | A1 | 12/2013 | Masini et al. | |
| 2014/0054916 | A1 | 2/2014 | Knudtson et al. | |
| 2014/0083606 | A1 | 3/2014 | Masini et al. | |
| 2014/0159468 | A1 | 6/2014 | Heinen et al. | |
| 2014/0182954 | A1 | 7/2014 | Weber | |
| 2014/0203624 | A1 | 7/2014 | Hilton et al. | |
| 2015/0027795 | A1 | 1/2015 | Hirai et al. | |
| 2015/0068832 | A1 | 3/2015 | Rumpel et al. | |
| 2015/0291017 | A1 | 10/2015 | LaBiche | |
| 2015/0367721 | A1 | 12/2015 | Shiraki et al. | |
| 2016/0106073 | A1 | 4/2016 | Van der Linde | |
| 2017/0050514 | A1 | 2/2017 | Li | |
| 2017/0113716 | A1 | 4/2017 | Gong et al. | |
| 2017/0225715 | A1 | 8/2017 | Kobayashi et al. | |
| 2017/0305253 | A1 | 10/2017 | Perle et al. | |
| 2018/0037151 | A1 | 2/2018 | Bauer et al. | |
| 2018/0043895 | A1 | 2/2018 | Shami et al. | |
| 2018/0108891 | A1 | 4/2018 | Fees et al. | |
| 2018/0237076 | A1 | 8/2018 | Perlo et al. | |
| 2018/0290627 | A1 | 10/2018 | Hariri et al. | |
| 2018/0337377 | A1 | 11/2018 | Stephens et al. | |
| 2018/0345777 | A1 | 12/2018 | Bimschein et al. | |
| 2019/0054895 | A1 | 2/2019 | Hall et al. | |
| 2019/0056005 | A1 | 2/2019 | Hall et al. | |
| 2019/0168678 | A1 | 6/2019 | Magnuson et al. | |
| 2019/0217764 | A1 | 7/2019 | Conny | |
| 2019/0389444 | A1 | 12/2019 | Kistner et al. | |
| 2020/0062183 | A1 | 2/2020 | Smith et al. | |
| 2020/0369140 | A1 | 11/2020 | McCarron et al. | |
| 2020/0369334 | A1 | 11/2020 | Lee | |
| 2021/0101641 | A1 | 4/2021 | Kim et al. | |
| 2021/0171120 | A1 | 6/2021 | Kim et al. | |
| 2021/0206432 | A1 | 7/2021 | Willison | |
| 2022/0041244 | A1 | 2/2022 | Upadhyay et al. | |
| 2022/0123397 | A1 | 4/2022 | Weicker et al. | |
| 2023/0062143 | A1 | 3/2023 | Zandbergen et al. | |
| 2023/0070279 | A1 | 3/2023 | Wheeler et al. | |
| 2023/0130254 | A1 | 4/2023 | Gonzalez et al. | |
| 2024/0278843 | A1 | 8/2024 | Nagasawa | |

FOREIGN PATENT DOCUMENTS

| | | | |
|---|---|---|---|
| CN | 110884568 | A | 3/2020 |
| DE | 19626901 | A1 | 1/1998 |
| DE | 102012101483 | A1 | 6/2013 |
| DE | 102015200737 | B4 | 6/2020 |
| DE | 102019109465 | A1 | 10/2020 |
| EP | 1538072 | A1 | 6/2005 |
| EP | 2552763 | A2 | 2/2013 |
| EP | 3174680 | A2 | 6/2017 |
| EP | 3689717 | A1 | 8/2020 |
| FR | 2698601 | A1 | 6/1994 |
| GB | 2479898 | A | 11/2011 |
| WO | 2016016662 | A2 | 2/2016 |

OTHER PUBLICATIONS

Written Opinion of the International Searching Authority; International Searching Authority; International Patent Application No. PCT/US2021/012327; Mar. 9, 2021; 8 pages.

International Search Report; International Searching Authority; International Patent Application No. PCT/US2021/012330; Mar. 9, 2021; 2 pages.

Written Opinion of the International Searching Authority; International Searching Authority; International Patent Application No. PCT/US2021/012330; Mar. 9, 2021; 9 pages.

International Search Report; International Searching Authority; International Patent Application No. PCT/US2021/012332; Mar. 24, 2021; 2 pages.

Written Opinion of the International Searching Authority; International Searching Authority; International Patent Application No. PCT/US2021/012332; Mar. 24, 2021; 7 pages.

Supplementary European Search Report; European Patent Office; European Application No. 21710384.5; Oct. 21, 2021; 12 pages.

International Search Report; International Searching Authority; International Patent Application No. PCT/US2022/014847; Mar. 8, 2022; 3 pages.

Written Opinion of the International Searching Authority; International Searching Authority; International Patent Application No. PCT/US2022/014847; Mar. 8, 2022; 6 pages.

International Search Report; International Searching Authority; International Patent Application No. PCT/US2022/014844; Mar. 16, 2022; 2 pages.

Written Opinion of the International Searching Authority; International Searching Authority; International Patent Application No. PCT/US2022/014844; Mar. 16, 2022; 7 pages.

International Search Report; International Searching Authority; International Patent Application No. PCT/US2022/014851; Apr. 25, 2022; 2 pages.

Written Opinion of the International Searching Authority; International Searching Authority; International Patent Application No. PCT/US2022/014851; Apr. 25, 2022; 7 pages.

International Search Report; International Searching Authority; International Patent Application No. PCT/US2022/014852; Apr. 18, 2022; 2 pages.

Written Opinion of the International Searching Authority; International Searching Authority; International Patent Application No. PCT/US2022/014852; Apr. 18, 2022; 7 pages.

Extended European Search Report; European Patent Office; European Patent Application No. 22153661.8; Jul. 6, 2022; 11 pages.

(56) References Cited

OTHER PUBLICATIONS

Partial European Search Report (R. 64 EPC); European Patent Office; European Patent Application No. 22153665.9; Aug. 18, 2022; 16 pages.
International Search Report; International Searching Authority; International Patent Application No. PCT/US2025/058415; Feb. 13, 2026; 3 pages.
Written Opinion of the International Searching Authority; International Searching Authority; International Patent Application No. PCT/US2025/058415; Feb. 13, 2026; 13 pages.
Invitation to Pay Additional Fees; International Searching Authority; International Patent Application No. PCT/US2025/058409; Feb. 19, 2026; 2 pages.
International Search Report; International Searching Authority; International Patent Application No. PCT/US2025/058420; Feb. 26, 2026; 2 pages.
Written Opinion of the International Searching Authority; International Searching Authority; International Patent Application No. PCT/US2025/058420; Feb. 26, 2026; 8 pages.
International Search Report; International Searching Authority; International Patent Application No. PCT/US2025/058408; Apr. 10, 2026; 3 pages.
Written Opinion of the International Searching Authority; International Searching Authority; International Patent Application No. PCT/US2025/058408; Apr. 10, 2026; 16 pages.
International Search Report; International Searching Authority; International Patent Application No. PCT/US2025/058409; Apr. 15, 2026; 4 pages.
Written Opinion of the International Searching Authority; International Searching Authority; International Patent Application No. PCT/US2025/058409; Apr. 15, 2026; 15 pages.

* cited by examiner

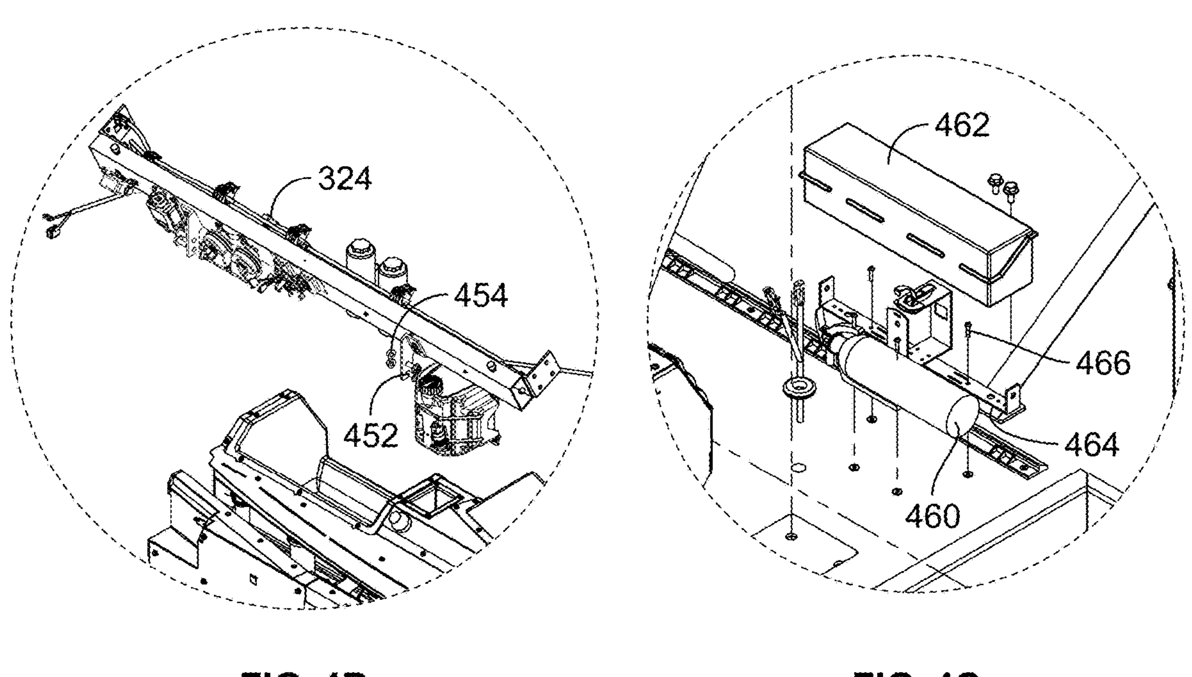
FIG. 4B FIG. 4C
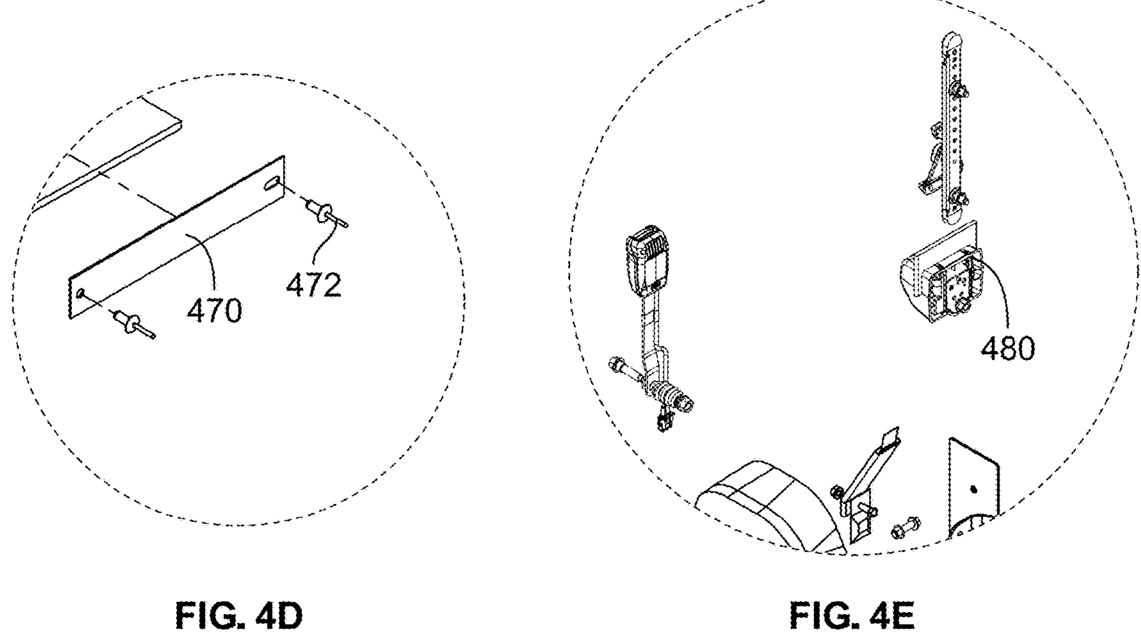
FIG. 4D
FIG. 4E

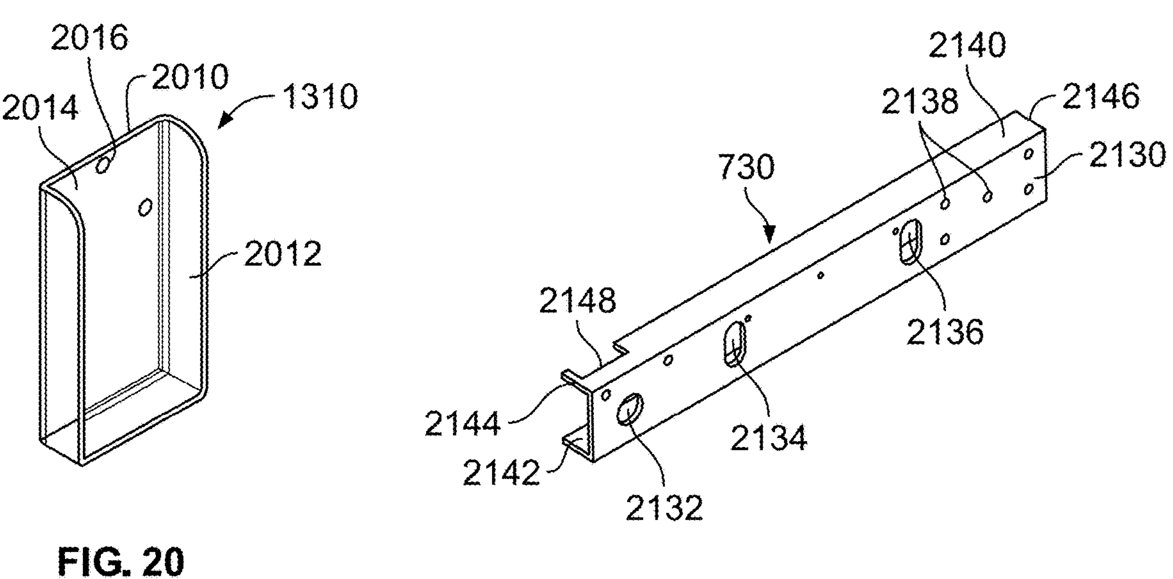
FIG. 20
FIG. 21
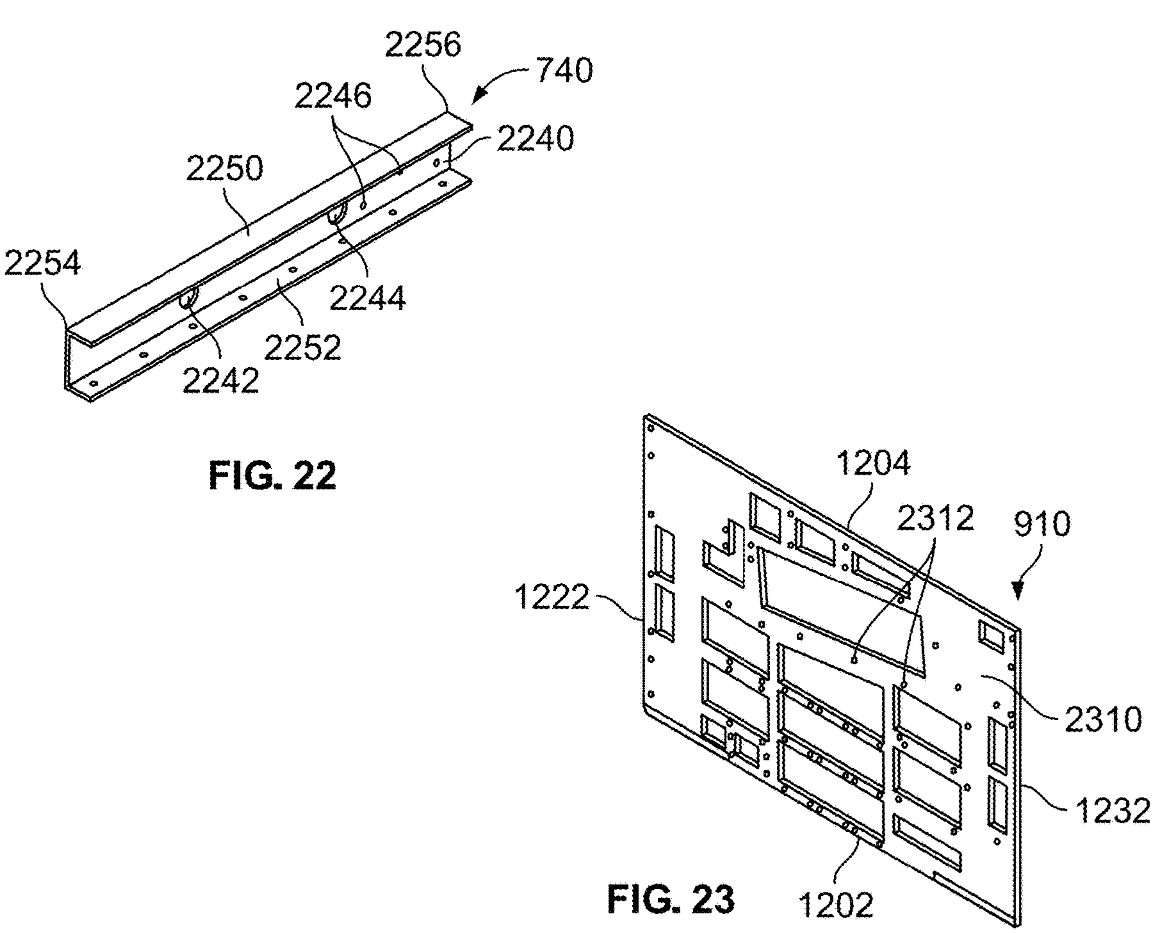
FIG. 22
FIG. 23

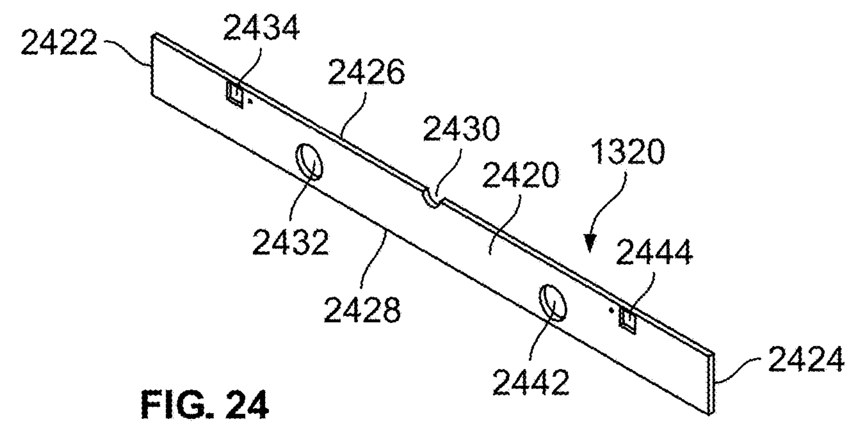
FIG. 24
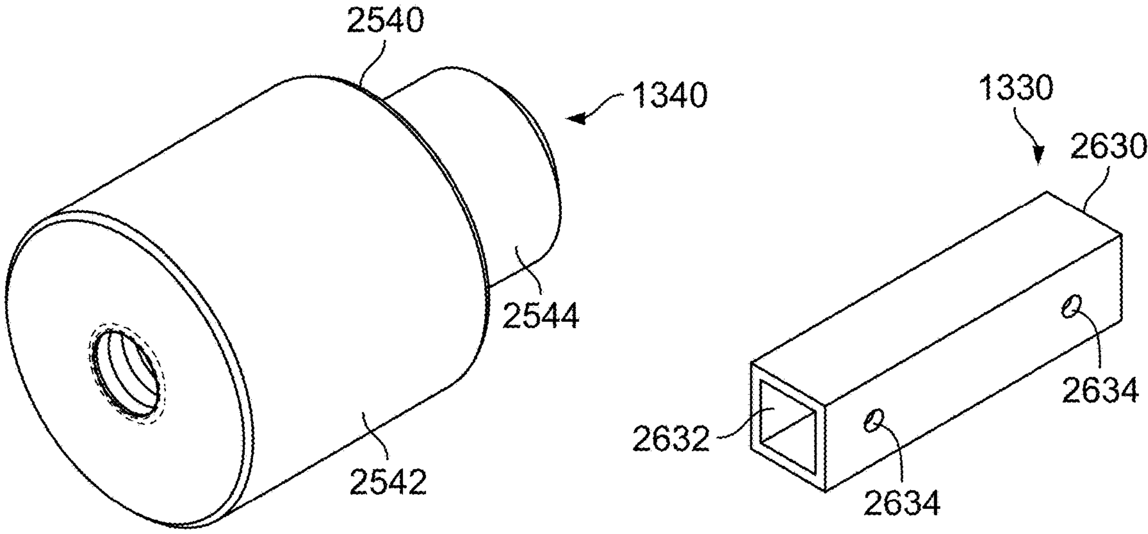
FIG. 25
FIG. 26
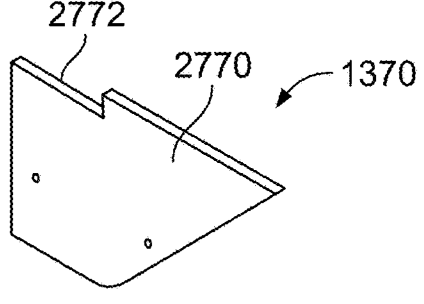
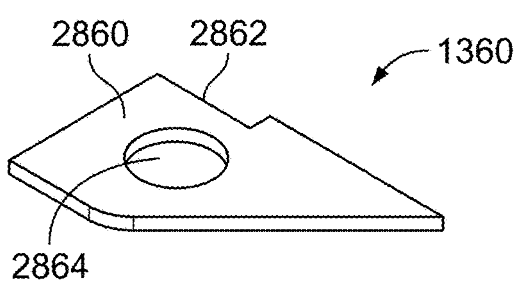
FIG. 27
FIG. 28

LAND VEHICLES INCORPORATING CRADLES FOR SUPPORTING ELECTRICAL DEVICES AND COMPONENTS THEREFOR

CROSS-REFERENCE TO RELATED APPLICATIONS

This application is a continuation of, and claims priority to, U.S. application Ser. No. 19/065,998, which was filed on Feb. 27, 2025. The contents of that application are incorporated herein by reference in their entirety.

TECHNICAL FIELD

The present disclosure generally relates to land vehicles adapted for use in delivery applications, and, more particularly, to electric delivery and utility vehicles.

BACKGROUND

Land vehicles adapted for use in delivery applications may have various shortcomings. In particular, electrically-powered delivery and utility vehicles may have certain drawbacks. For those reasons, among others, electrically-powered land vehicles suited for use in delivery applications that avoid the limitations of conventional components and/or systems remain an area of interest.

SUMMARY

The present disclosure may comprise one or more of the following features and combinations thereof.

According to one aspect of the present disclosure, a land vehicle may include a chassis extending in a longitudinal direction and a plurality of wheels supported by the chassis including a pair of front wheels and a pair of rear wheels arranged rearward of the pair of front wheels in the longitudinal direction. The chassis may include a power source cradle assembly supporting a plurality of power sources of the vehicle that is arranged between the pair of front wheels and the pair of rear wheels in the longitudinal direction. The power source cradle assembly may include a first crossbeam assembly, a second crossbeam assembly, a first sidewall assembly, and a second sidewall assembly. The first crossbeam assembly may be disposed at a forward end of the power source cradle assembly and extend in a lateral direction perpendicular to the longitudinal direction. The second crossbeam assembly may be disposed at a rearward end of the power source cradle assembly opposite the forward end and extend in the lateral direction. The first sidewall assembly may be disposed at one lateral end of the power source cradle assembly and extend in the longitudinal direction to couple the first crossbeam assembly and the second crossbeam assembly. The second sidewall assembly may be disposed at another lateral end of the power source cradle assembly opposite the one lateral end and extend in the longitudinal direction to couple the first crossbeam assembly and the second crossbeam assembly. The first crossbeam assembly, the second crossbeam assembly, the first sidewall assembly, and the second sidewall assembly may cooperatively establish an enclosure in which the plurality of power sources are at least partially enclosed.

In some embodiments, the first crossbeam assembly, the second crossbeam assembly, the first sidewall assembly, and the second sidewall assembly may be separate structures that are coupled to one another to establish the enclosure.

In some embodiments, the chassis may include a midframe assembly arranged at least partially between the pair of front wheels and at least a portion of the power source cradle assembly in the longitudinal direction.

In some embodiments, the midframe assembly may include a pair of support arm structures spaced apart from one another in the lateral direction, and the first crossbar assembly may extend in the lateral direction to couple the pair of support arm structures to one another.

In some embodiments, the first crossbar assembly may at least partially define the midframe assembly.

In some embodiments, the first sidewall assembly may include a first sidewall panel extending in a vertical direction and a first flap interconnected with the first sidewall panel such that the first flap extends in a horizontal direction perpendicular to the vertical direction, and the first sidewall panel may be integral with the first flap.

In some embodiments, the first flap may be disposed at a forward end of the first sidewall assembly.

In some embodiments, the first sidewall assembly may include a floor support bar coupled to the first sidewall panel and positioned for direct contact with an overlying floor of the vehicle.

In some embodiments, the floor support bar may be disposed at a rear end of the first sidewall assembly.

In some embodiments, the first and second sidewall assemblies may be substantially identical, and the first and second crossbeam assemblies may be structurally distinguishable.

In some embodiments, the enclosure may at least partially house a plenum to supply cooling air to the plurality of power sources in use of the vehicle.

According to another aspect of the present disclosure, a land vehicle may include a a chassis extending in a longitudinal direction and a plurality of wheels supported by the chassis including a pair of front wheels and a pair of rear wheels arranged rearward of the pair of front wheels in the longitudinal direction. The chassis may include a power source cradle assembly supporting a plurality of power sources of the vehicle that is arranged between the pair of front wheels and the pair of rear wheels in the longitudinal direction. The chassis may include an electronics cradle assembly supporting a plurality of electronic devices of the vehicle that is arranged rearward of the pair of rear wheels in the longitudinal direction.

In some embodiments, the electronics cradle assembly may include a cover plate extending from a forward end of the electronics cradle assembly to a rear end of the electronics cradle assembly arranged opposite the forward end to at least partially cover the plurality of electronic devices.

In some embodiments, the cover plate may be formed to include a plurality of slots.

In some embodiments, the plurality of slots may include multiple rows of slots each spaced from one another in a lateral direction perpendicular to the longitudinal direction.

In some embodiments, the multiple rows of slots may include at least three rows of slots.

In some embodiments, the electronics cradle assembly may include a pair of channel feet coupled to an underside of the cover plate such that the pair of channel feet are spaced from one another in a lateral direction perpendicular to the longitudinal direction, and each of the pair of channel feet may have a C-shaped cross-section.

According to yet another aspect of the present disclosure, a land vehicle may include a chassis extending in a longitudinal direction and a plurality of wheels supported by the chassis including a pair of front wheels and a pair of rear wheels arranged rearward of the pair of front wheels in the longitudinal direction. The chassis may include a power source cradle assembly supporting a plurality of power sources of the vehicle that is arranged between the pair of front wheels and the pair of rear wheels in the longitudinal direction. The power source cradle assembly may at least partially house a plenum to supply cooling air to the plurality of power sources in use of the vehicle. The chassis may include an electronics cradle assembly supporting a plurality of electronic devices of the vehicle that is arranged rearward of the pair of rear wheels in the longitudinal direction.

In some embodiments, the power source cradle assembly may include a first crossbeam assembly disposed at a forward end of the power source cradle assembly that extends in a lateral direction perpendicular to the longitudinal direction, a second crossbeam assembly disposed at a rearward end of the power source cradle assembly opposite the forward end that extends in the lateral direction, a first sidewall assembly disposed at one lateral end of the power source cradle assembly that extends in the longitudinal direction to couple the first crossbeam assembly and the second crossbeam assembly, and a second sidewall assembly disposed at another lateral end of the power source cradle assembly opposite the one lateral end that extends in the longitudinal direction to couple the first crossbeam assembly and the second crossbeam assembly.

In some embodiments, the electronics cradle assembly may include (i) a cover plate extending from a forward end of the electronics cradle assembly to a rear end of the electronics cradle assembly arranged opposite the forward end to at least partially cover the plurality of electronic devices and (ii) a pair of channel feet coupled to an underside of the cover plate such that the pair of channel feet are spaced from one another in a lateral direction perpendicular to the longitudinal direction, and each of the pair of channel feet may have a C-shaped cross-section.

These and other features of the present disclosure will become more apparent from the following description of the illustrative embodiments.

BRIEF DESCRIPTION OF THE FIGURES

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 4B is a magnified view of one portion of the vehicle chassis of FIG. 4A;

FIG. 4C is a magnified view of another portion of the vehicle chassis of FIG. 4A;

FIG. 4D is a magnified view of yet another portion of the vehicle chassis of FIG. 4A FIG. 4E is a magnified view of another portion still of the vehicle chassis of FIG. 4A;

FIG. 20 is a perspective view of an air dryer mount included in the electronics cradle assembly shown in FIG. 12;

FIG. 21 is a perspective view of one channel foot included in the electronics cradle assembly shown in FIG. 12;

FIG. 22 is a perspective view of another channel foot included in the electronics cradle assembly shown in FIG. 12;

FIG. 23 is a perspective view of a cover plate included in the electronics cradle assembly shown in FIG. 12;

FIG. 24 is a perspective view of a cover flap included in the electronics cradle assembly shown in FIG. 12;

FIG. 25 is a perspective view of a spacer included in the electronics cradle assembly shown in FIG. 12;

FIG. 26 is a perspective view of a bar included in the electronics cradle assembly shown in FIG. 12;

FIG. 27 is a perspective view of one divider included in the electronics cradle assembly shown in FIG. 12; and FIG. 28 is a perspective view of another divider included in the electronics cradle assembly shown in FIG. 12.

DETAILED DESCRIPTION OF ILLUSTRATIVE EMBODIMENTS

Figure 1:
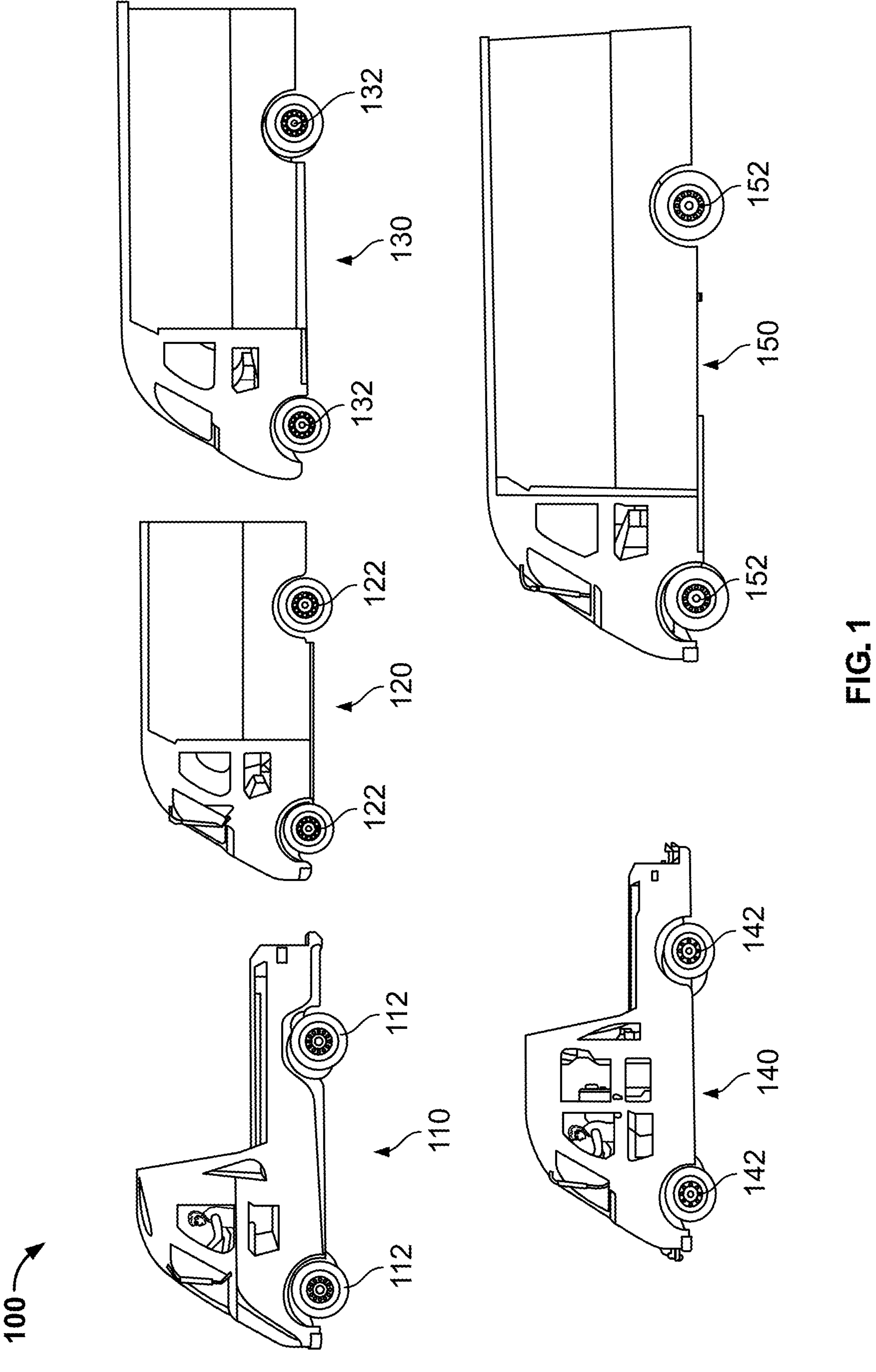
FIG. 1 depicts side elevation views of a number of electric vehicles that may incorporate cradle assemblies supporting electrical components according to certain embodiments of the disclosure.
Figure 2:
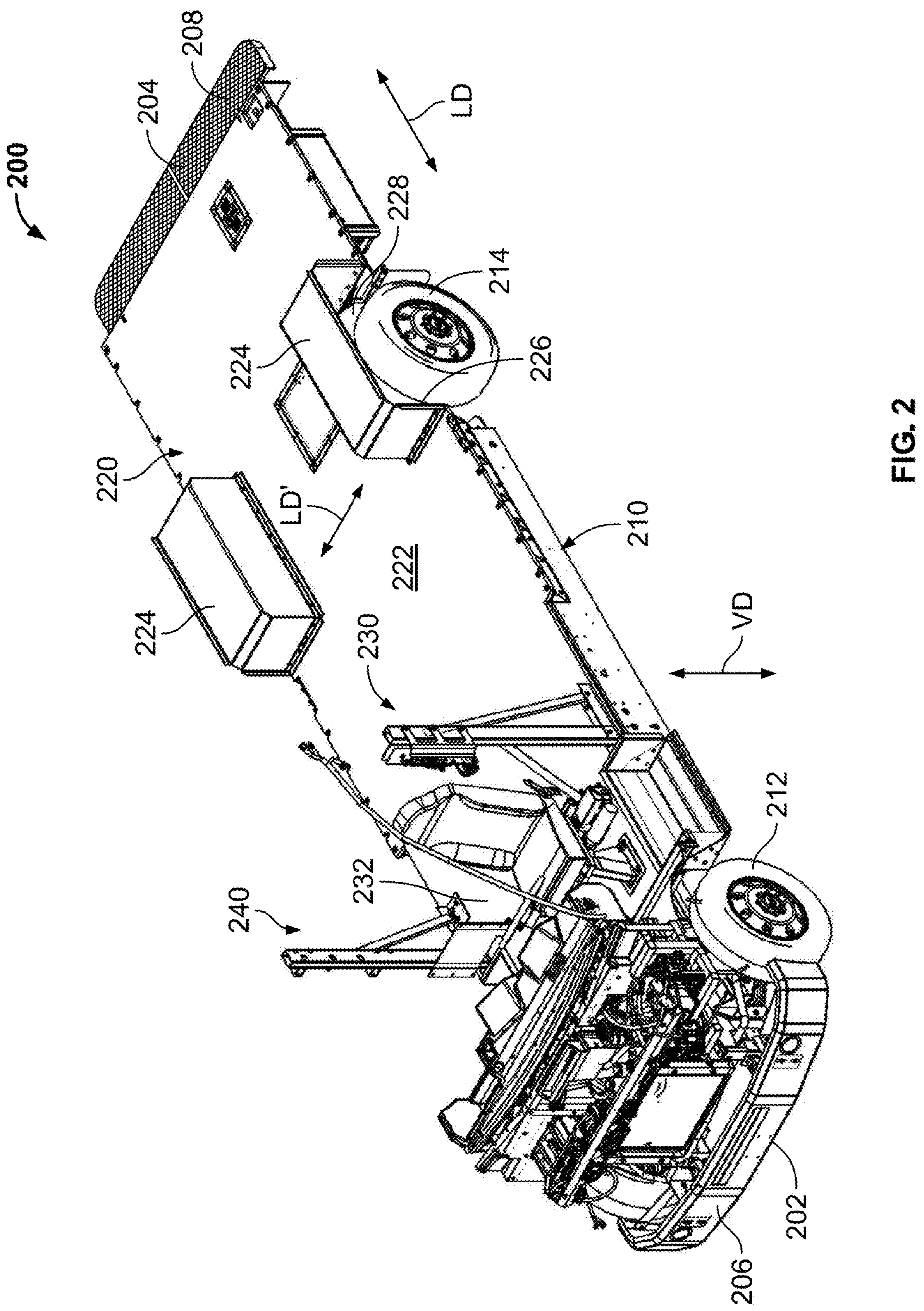
FIG. 2 is a perspective view of a vehicle chassis at least partially obscured by a vehicle floor and adapted for inclusion in one or more of the electric vehicles of FIG. 1 according to certain embodiments of the disclosure.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features, such as those representing devices, modules, instructions blocks and data elements, may be shown in specific arrangements and/or orderings for ease of description. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

In some embodiments, schematic elements used to represent blocks of a method may be manually performed by a user. In other embodiments, implementation of those schematic elements may be automated using any suitable form of machine-readable instruction, such as software or firmware applications, programs, functions, modules, routines, processes, procedures, plug-ins, applets, widgets, code fragments and/or others, for example, and each such instruction may be implemented using any suitable programming language, library, application programming interface (API), and/or other software development tools. For instance, in some embodiments, the schematic elements may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others, for example.

Further, in the drawings, where connecting elements, such as solid or dashed lines or arrows, are used to illustrate a connection, relationship, or association between or among two or more other schematic elements, the absence of any such connection elements is not meant to imply that no connection, relationship, or association can exist. In other words, some connections, relationships, or associations between elements may not be shown in the drawings so as not to obscure the disclosure. In addition, for ease of illustration, a single connecting element may be used to represent multiple connections, relationships, or associations between elements. For example, where a connecting element represents a communication of signals, data or instructions, it should be understood by those skilled in the art that such element may represent one or multiple signal paths (e.g., a bus), as may be needed, to effect the communication.

Referring now to FIG. 1, an illustrative line 100 of land vehicles includes a plurality of land vehicles. In the illustrative embodiment, the land vehicle line 100 includes, but is not limited to, a two-passenger flatbed utility vehicle 110 having wheels 112, a 650 cubic foot capacity delivery vehicle 120 having wheels 122, a 1000 cubic foot capacity delivery vehicle 130 having wheels 132, a six-passenger flatbed utility vehicle 140 having wheels 142, and a 1200 cubic foot capacity delivery vehicle 150 having wheels 152. In some embodiments, the land vehicle line 100 may be similar to the vehicle line 100 discussed in U.S. Pat. No. 11,400,982, which issued on Aug. 2, 2022, and which is incorporated by reference herein in its entirety. However, in some embodiments, the land vehicle line 100 may include any vehicle having a capacity within a particular range, such as a range of from 400 cubic feet to 1400 cubic feet, for example. Additionally, in some embodiments, the land vehicle line 100 may include a vehicle similar to the vehicle 100 discussed in U.S. Pat. No. 11,440,456, which issued on Sep. 13, 2022, and which is incorporated by reference herein in its entirety.

Referring now to FIG. 2 and FIGS. 3A-3C, an illustrative land vehicle 200 may be included in the line 100. In one example, the vehicle 200 may be similar to the delivery vehicle 150. The vehicle 200 is depicted with various external structures (e.g., a body having sidewalls, a rear compartment, a roof) omitted to better visualize a multi-segment chassis or main frame 210 thereof, among other things. In the illustrative arrangement, the chassis 210 is at least partially covered by a floor assembly 220 such that the chassis 210 and the floor assembly 220 extend in a longitudinal direction LD between a front end 202 of the vehicle 200 and a rear end 204 of the vehicle 200. The front end 202 includes a front bumper 206 and the rear end 204 includes a rear bumper 208, and each of the bumpers 206, 208 is coupled to, and supported by, the chassis 210.

The vehicle 200 illustratively includes a pair of front wheels 212 and a pair of rear wheels 214 supported by the chassis 210. The rear wheels 214 are arranged rearward of the front wheels 212 in the longitudinal direction LD. The illustrative floor assembly 220 includes a main floor body 222 and a pair of tire enclosure blocks 224 coupled to the main floor body 222 such that each of the tire enclosure blocks 224 extends above the main floor body 222 in a vertical direction VD. Each of the tire enclosure blocks 224 is sized to at least partially cover and enclose one of the rear wheels 214. In some embodiments, the floor assembly 220 does not include enclosure blocks or similar structures for the front wheels 212.

In the illustrative embodiment, the main floor body 222 is formed to include cutouts 226 extending inwardly therethrough in a lateral direction LD' perpendicular to the longitudinal direction LD. The cutouts 226 are illustratively aligned with the tire enclosure blocks 224 in the longitudinal direction LD and the lateral direction LD' such that the tire enclosure blocks 224 extend above and overhang the cutouts 226. When the rear wheels 214 are supported by the chassis 210 and the chassis 210 is covered and overlaid by the floor assembly 220, the cutouts 226 and the pair of tire enclosure blocks 224 cooperatively define wells 228 in which each one of the rear wheels 214 is disposed. Each of the wells 228 is sized to ensure spatial clearance between the tire mounted to a corresponding one of the rear wheels 214 and the corresponding enclosure block 224 covering the tire.

In the illustrative embodiment, the vehicle 200 includes a seatbelt tower assembly 230 supported by the chassis 210 and the floor assembly 220. The illustrative seatbelt tower assembly 230 is configured to secure a seatbelt (not shown) for an operator in an operator cabin 232. In some embodiments, the seatbelt tower assembly 230 may be similar to the seatbelt tower assembly 720 discussed in co-pending U.S. application Ser. No. 18/829,761, which was filed on Sep. 10, 2024, and which is incorporated by reference herein in its entirety.

In the illustrative embodiment, the vehicle 200 includes a seat frame assembly 240 supported by the chassis 210 and the floor assembly 220 that is configured to support a seat (not shown) for a passenger in the operator cabin 232. The seat frame assembly 240 is spaced from the seatbelt tower assembly 230 in the lateral direction LD' and aligned with the seatbelt tower assembly 230 in the longitudinal direction LD. In some embodiments, the seat frame assembly 240 may be similar to the seat frame assembly 730 discussed in co-pending U.S. application Ser. No. 18/829,761.

The multi-segment chassis 210 illustratively includes a front suspension subframe assembly 310 (see FIG. 3A) that supports the pair of front wheels 212, a rear suspension subframe assembly 330 that supports the pair of rear wheels 214, a power source cradle assembly 350 arranged between the front suspension subframe assembly 310 and the rear suspension subframe assembly 330 in the longitudinal direction LD, a midframe assembly 370 arranged at least partially between the front suspension subframe assembly 310 and at least a portion of the power source cradle assembly 350 in the longitudinal direction LD, and an electronics cradle assembly 390 arranged rearward of the rear suspension subframe assembly 330 in the longitudinal direction LD. As discussed below, the power source cradle assembly 350 is configured to support one or more electrical power sources 352 (e.g., battery packs) that may be used to supply power to one or more electric motors or drive units of the vehicle 200. Further, as discussed below, the electronics cradle assembly 390 is configured to support one or more electronic devices (not shown) distinct from the power sources 352. Further still, as discussed below, the power source cradle assembly 350 and the midframe assembly 370 cooperatively establish an enclosure 608 (see FIG. 6) in which the power sources 352 are at least partially enclosed in use of the vehicle 200.

In the illustrative embodiment, the vehicle 200 includes a pair of front suspension assemblies or systems 320A, 320B each coupled to one of the pair of front wheels 212 and the chassis 210 to support the pair of front wheels 212 for rotation relative to the chassis 210 in use of the vehicle 200. Additionally, the illustrative vehicle 200 includes a pair of rear suspension assemblies or systems 340A, 340B each coupled to one of the pair of rear wheels 214 and the chassis 210 to support the pair of rear wheels 214 for rotation relative to the chassis 210 in use of the vehicle 200. In some embodiments, the front suspension assemblies 320A, 320B may be identical or substantially similar to one another, and the rear suspension assemblies 340A, 340B may be identical or substantially similar to one another. Further, in some embodiments, the front suspension assemblies 320A, 320B may be different and/or structurally distinguishable from the rear suspension assemblies 340A, 340B.

Figure 5:
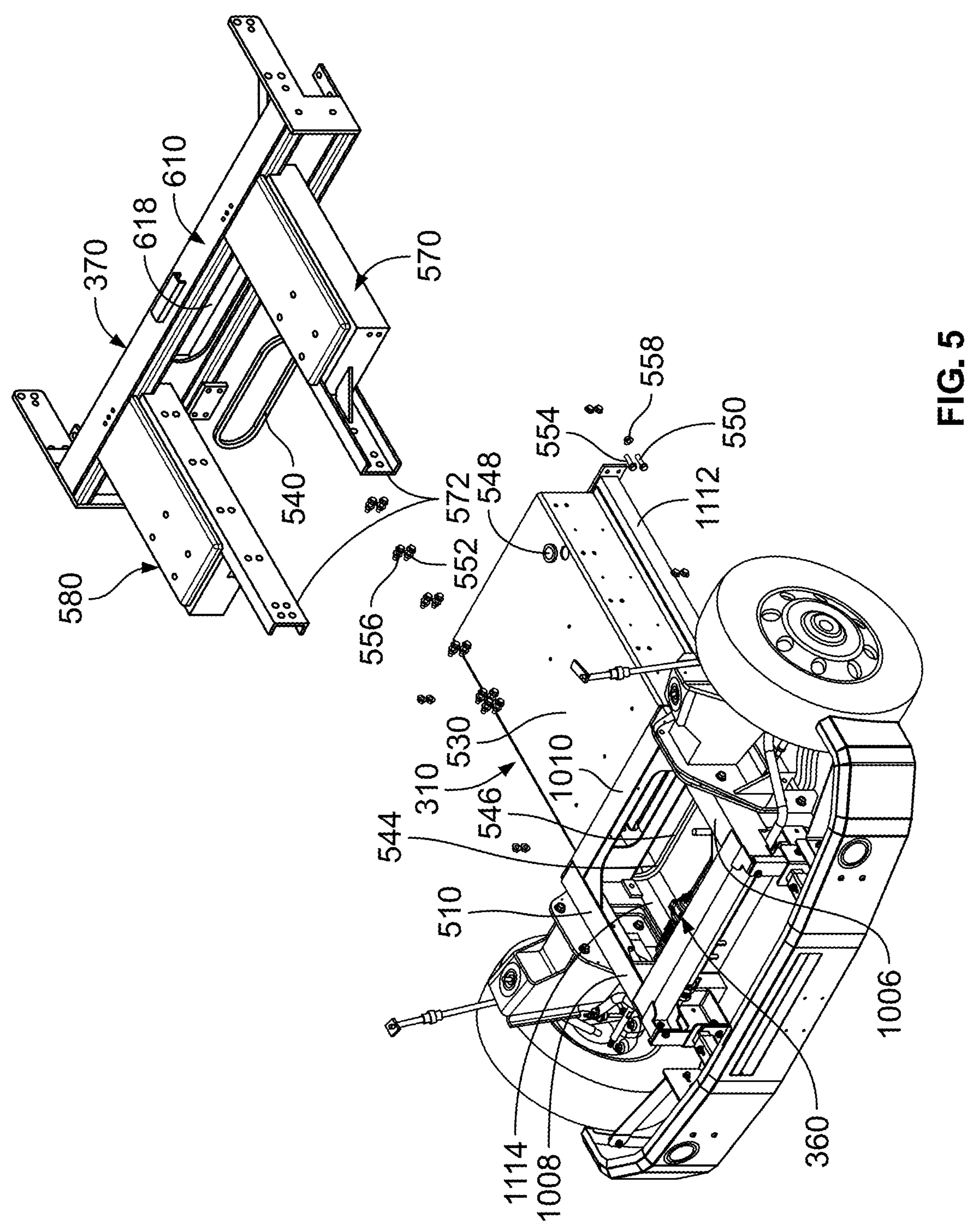
FIG. 5 is a perspective view of part of the chassis of FIG. 3A with certain features omitted for the sake of clarity that illustrates a pair of front suspension assemblies mounted to a front suspension subframe assembly of the chassis and a midframe assembly coupled to the front suspension subframe assembly.
Figure 7:
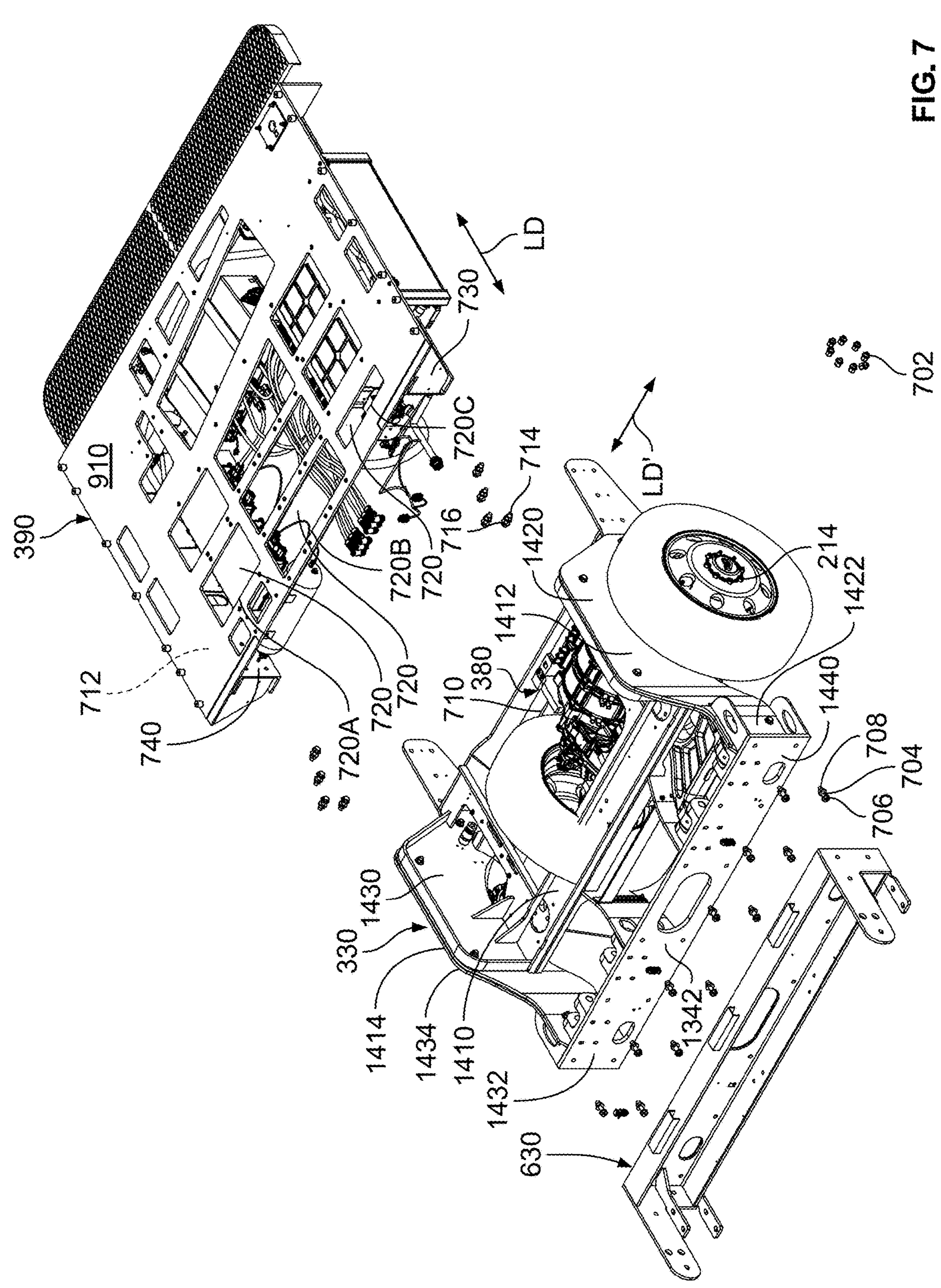
FIG. 7 is a perspective view of part of the chassis of FIG. 3A with certain features omitted for the sake of clarity that illustrates a rear crossbeam assembly of the power source cradle assembly, a pair of rear suspension assemblies mounted to a rear suspension subframe assembly of the chassis, and an electronics cradle assembly supporting a plurality of electronic devices of the vehicle.

In the illustrative embodiment, the vehicle 200 includes a powertrain unit 360 that is supported by the front suspension subframe assembly 310 and coupled to the front wheels 212. Additionally, the vehicle 200 includes a powertrain unit 380 that is supported by the rear suspension subframe assembly 330 and coupled to the rear wheels 214. As shown in FIG. 5, the powertrain unit 360 extends in the lateral direction LD' through opposite sides 1006, 1008 of a cage 1010 of the front suspension subframe assembly 310 such that the powertrain unit 360 is at least partially surrounded by the front suspension subframe assembly 310 at the sides 1006, 1008 of the cage 1010. As shown in FIG. 7, the powertrain unit 380 is arranged beneath opposite sides 1432, 1434 of the rear suspension subframe assembly 330 in the vertical direction VD without being surrounded by the opposite sides 1432, 1434.

Figure 3A:
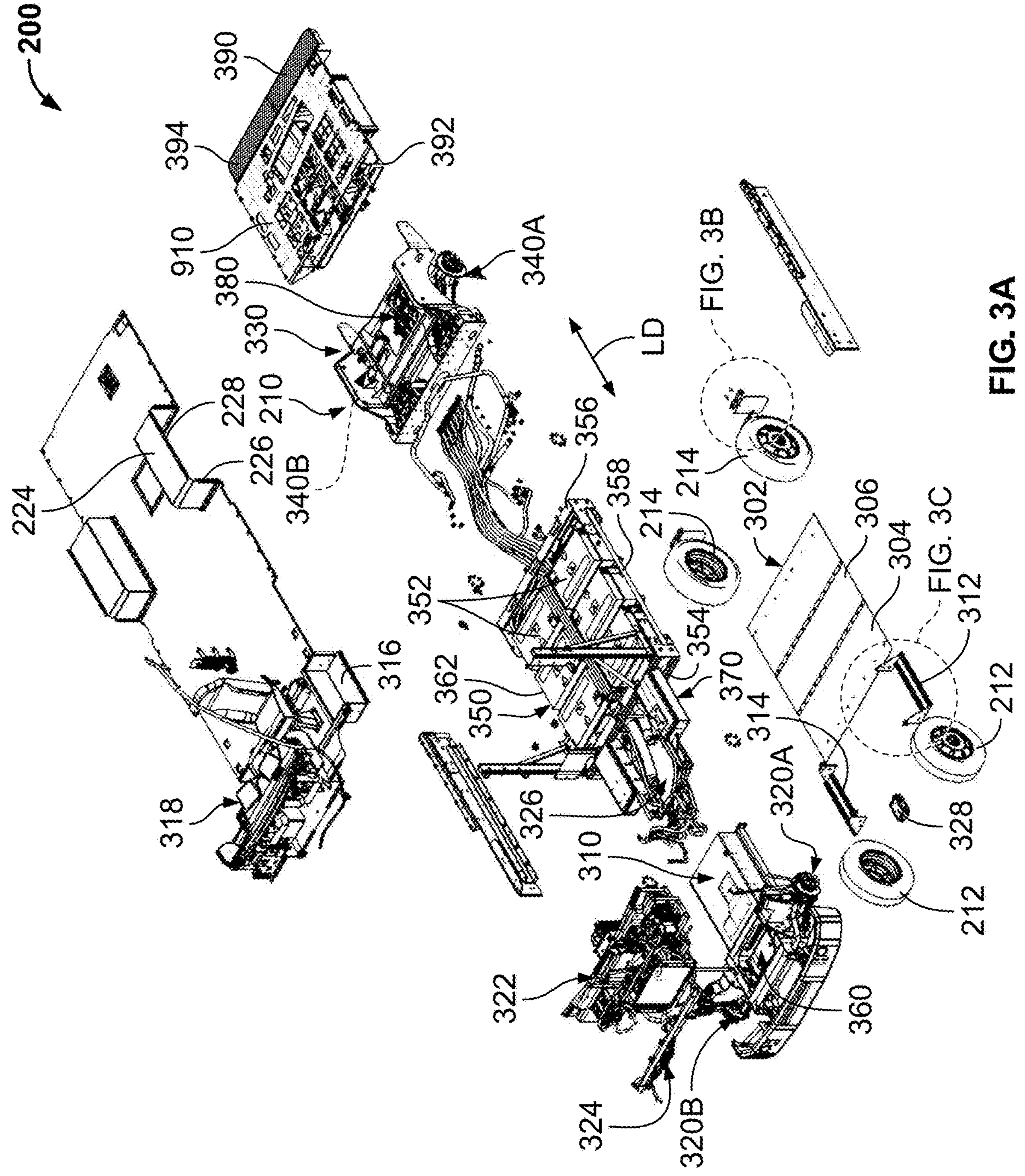
FIG. 3A is a partially exploded perspective view of the vehicle chassis of FIG. 2 depicting various sections or segments of the chassis arranged along a longitudinal axis.

The illustrative front suspension subframe assembly 310 of the chassis 210 includes base rails 1112, 1114 (see FIG. 5) that are spaced from one another in the lateral direction LD'. As shown in FIGS. 3A and 5, the front suspension assembly 320A is mounted to the base rail 1112 such that the front suspension assembly 320A is arranged outward of the base rail 1112 in the lateral direction LD'. Additionally, the front suspension assembly 320B is mounted to the base rail 1114 such that the front suspension assembly 320B is arranged outward of the base rail 1114 in the lateral direction LD'.

The illustrative rear suspension subframe assembly 330 of the chassis 210 includes a base plate 1410 (see FIG. 7), one frame arch 1420 coupled to the base plate 1410 at one lateral end 1412 thereof that defines the side 1432, and another frame arch 1430 coupled to the base plate 1410 at another lateral end 1414 thereof opposite the end 1412 that defines the side 1434. The rear suspension assembly 340A is mounted to the rear suspension subframe assembly 330 adjacent the frame arch 1420 such that the rear suspension assembly 340A is arranged at least partially inward of the frame arch 1420 in the lateral direction LD'. The rear suspension assembly 340B is mounted to the rear suspension subframe assembly 330 adjacent the frame arch 1430 such that the rear suspension assembly 340B is arranged at least partially inward of the frame arch 1430 in the lateral direction LD'.

Figure 9:
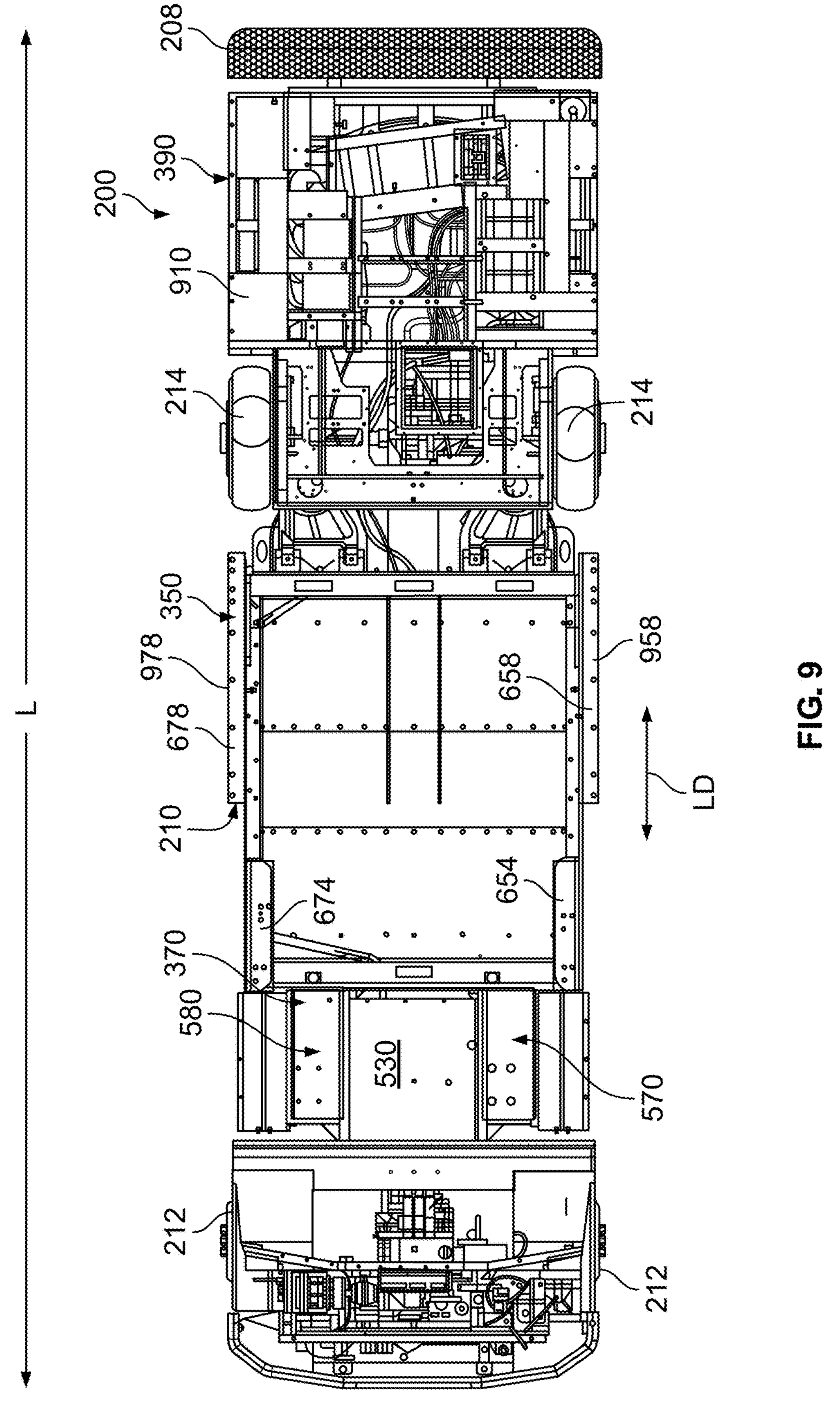
FIG. 9 is a top view of the vehicle chassis of FIG. 2 depicting various sections or segments of the assembled chassis arranged along a longitudinal axis.

The illustrative power source cradle assembly 350 of the chassis 210 is arranged between the front wheels 212 and the rear wheels 214 in the longitudinal direction LD. More specifically, as best seen in FIG. 9, the power source cradle assembly 350 is arranged midway along a length L of the vehicle 200 in the longitudinal direction LD between the front wheels 212 and the rear wheels 214. In the illustrative embodiment, the power source cradle assembly 350 is at least partially defined by, and directly coupled to, the midframe assembly 370, as discussed below.

The power source cradle assembly 350 illustratively includes a crossbeam assembly 610 (see FIG. 6), a crossbeam assembly 630, a sidewall assembly 650, and a sidewall assembly 670. The crossbeam assembly 610 is disposed at a forward end 354 of the power source cradle assembly 350 and extends in the lateral direction LD' between the sidewall assemblies 650, 670. The crossbeam assembly 630 is disposed at a rear end 356 of the power source cradle assembly 350 opposite the forward end 354 and extends in the lateral direction LD' between the sidewall assemblies 650, 670. The sidewall assembly 650 is disposed at a lateral side 358 of the power source cradle assembly 350 and extends in the longitudinal direction LD to couple the crossbeam assembly 610 and the crossbeam assembly 630. The sidewall assembly 670 is disposed at a lateral side 362 of the power source cradle assembly 350 opposite the side 358 and extends in the longitudinal direction LD to couple the crossbeam assembly 610 and the crossbeam assembly 630. In some embodiments, the crossbeam assemblies 610, 630 and the sidewall assemblies 650, 670 cooperatively establish the enclosure 608 for storing the power sources 352.

In some embodiments, the crossbeam assembly 610 may be included in, or otherwise form a portion of, the midframe assembly 370. In such embodiments, the midframe assembly 370 and the power source cradle assembly 350 may cooperatively establish the enclosure 608. Additionally, in some embodiments, the power source cradle assembly 350 at least partially houses a cooling air distribution chamber or plenum 690 (shown in phantom) in the enclosure 608. The plenum 690 may be configured to supply cooling air to the power sources 352 stored in the enclosure 608 to cool the power sources 352 in use thereof. In some embodiments, cooling air may be provided by one or more cooling air sources (e.g., one or more blowers, heat exchangers, or the like) adapted for positioning in the enclosure 608 or another suitable location.

The illustrative electronics cradle assembly 390 of the chassis 210 is arranged rearward of the rear wheels 214 in the longitudinal direction LD. More specifically, as best seen in FIG. 9, the electronics cradle assembly 390 is arranged rearward of the rear wheels 214 and forward of the rear bumper 208 in the longitudinal direction LD. In the illustrative embodiment, the electronics cradle assembly 390 includes a cover plate 910 (see FIG. 9) that extends from a forward end 392 of the electronics cradle assembly 390 to a rear end 394 of the electronics cradle assembly 390 arranged opposite the forward end 392 to at least partially cover the electronic devices supported by the cradle assembly 390 in use thereof.

As shown in FIG. 3A, the illustrative vehicle 200 includes a variety of features in addition to the aforementioned devices, assemblies, and/or systems. Those features include, but are not limited to, the following: a skid plate system 302 arranged beneath at least a portion of the front suspension subframe assembly 310 and/or the midframe assembly 370 in the vertical direction VD that includes skid plates 304 and 306; step supports 312, 314 each affixed to a step platform 316 that is located at least partially beneath the main floor body 222 in the vertical direction VD; an instrument panel assembly 318 arranged in the operator cabin 232 above the main floor body 222 in the vertical direction VD; a firewall assembly 322 arranged between the front bumper 206 and the instrument panel assembly 318 in the longitudinal direction LD; a crossbar assembly 324 coupled to the firewall assembly 322 that extends across the firewall assembly 322 in the lateral direction LD'; one or more wiring harnesses or carriers 326 for routing and/or carrying various electrical cables or wiring that may be arranged at least partially between the front suspension subframe assembly 310 and the midframe assembly 370 in the longitudinal direction LD; and a junction box 328.

Figure 3B:
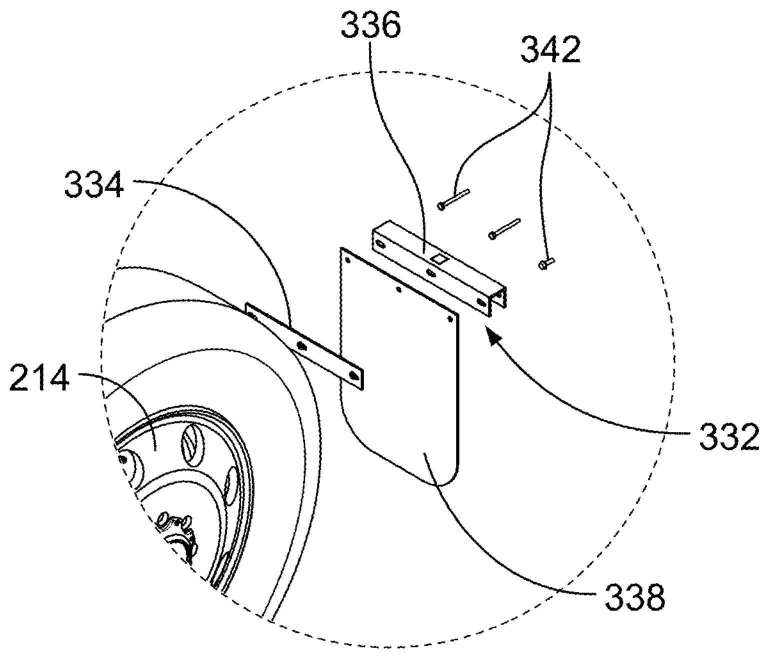
FIG. 3B is a magnified view of one portion of the vehicle chassis of FIG. 3A.

As shown in FIG. 3B, the illustrative vehicle 200 includes a mudflap assembly 332 mounted adjacent to each one of the rear wheels 214. In some embodiments, each mudflap assembly 332 is mounted adjacent to the corresponding rear wheel 214 such that each mudflap assembly 332 is arranged at least partially rearward of the corresponding rear wheel 214 in the longitudinal direction LD. Each mudflap assembly 332 includes a mudflap mount bracket 334, a mudflap support bar 336, a mudflap 338, and one or more fasteners 342. The mudflap mount bracket 334 is mounted to the chassis 210 (e.g., the rear suspension subframe assembly 330). The mudflap support bar 336 is coupled to the mudflap mount bracket 334 using the fasteners 342 when the mudflap 338 is sandwiched between the mudflap mount bracket 334 and the mudflap support bar 336.

Figure 3C:
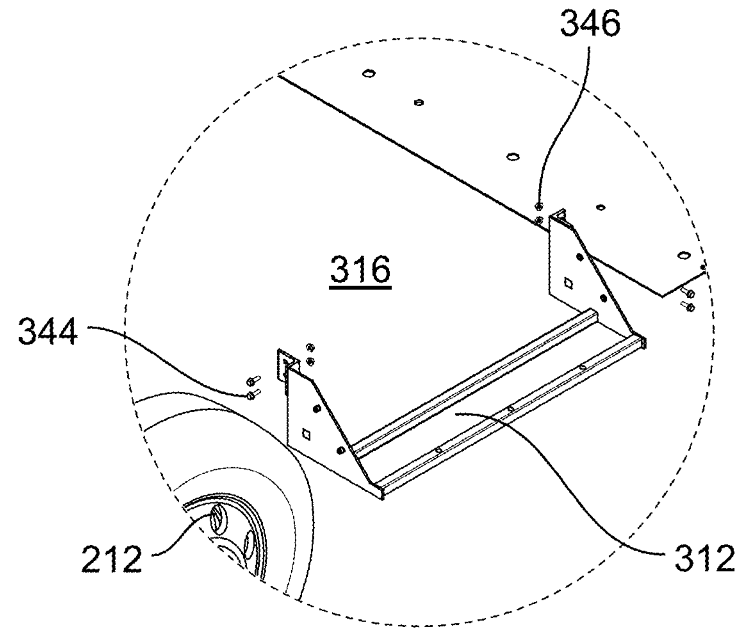
FIG. 3C is a magnified view of another portion of the vehicle chassis of FIG. 3A.

As shown in FIG. 3C, the step supports 312, 314 (note that only step support 312 is depicted) are affixed to the step platforms 316 adjacent to each one of the front wheels 212. In some embodiments, each step support 312, 314 is affixed to the corresponding step platform 316 such that each step support 312, 314 is arranged at least partially rearward of the corresponding front wheel 212 in the longitudinal direction LD. Each step support 312, 314 is affixed to the corresponding step platform 316 using one or more fasteners 344 and one or more locknuts 346.

Figure 4A:
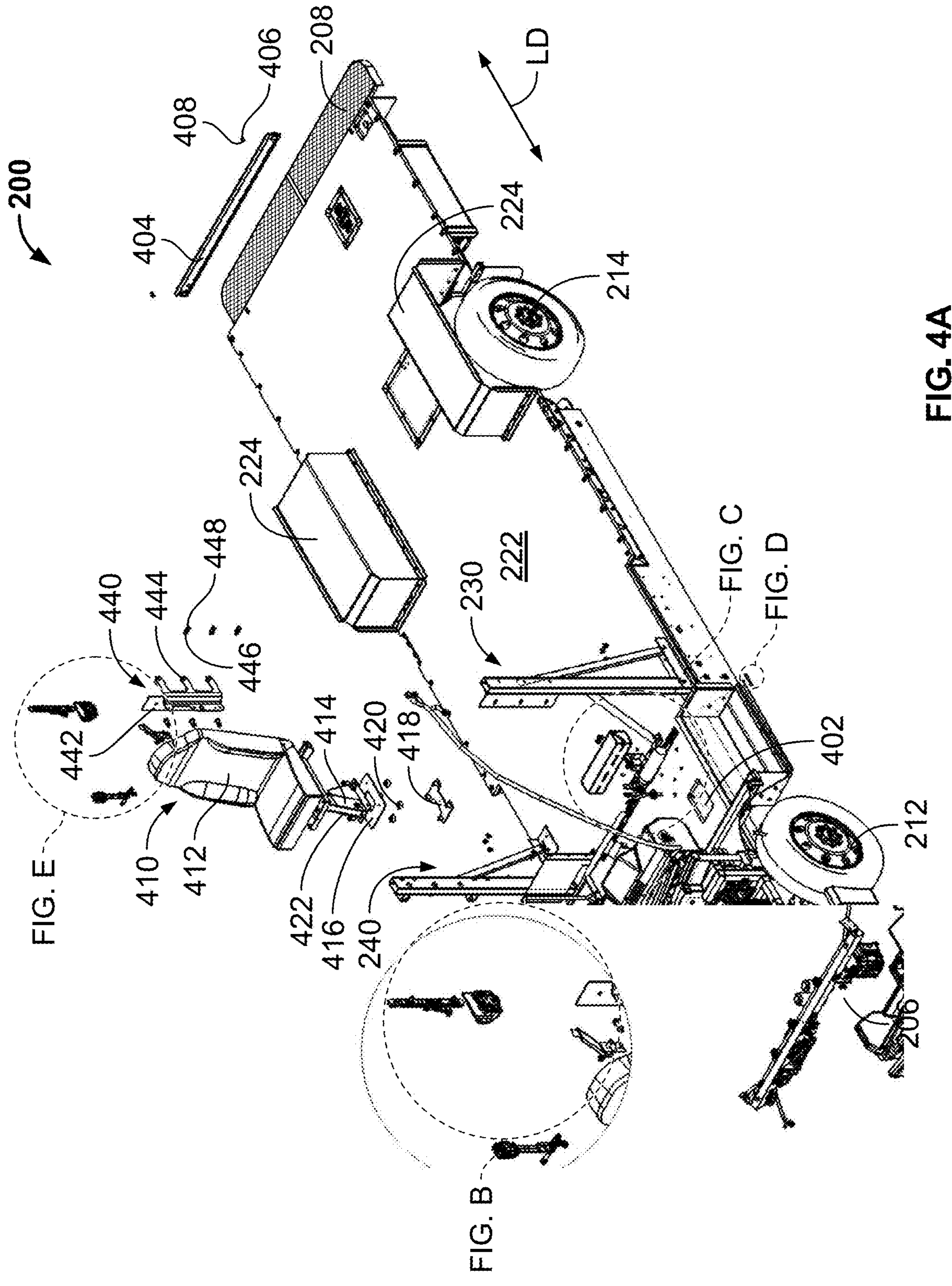
FIG. 4A is a partially exploded perspective view of the vehicle chassis of FIG. 2 showing at least one seat frame assembly de-coupled from the chassis and a pair of seatbelt tower assemblies coupled to the chassis.

Referring now to FIG. 4A, the vehicle 200 is illustrated with the chassis 210 covered by the floor assembly 220 and each of the seatbelt tower assembly 230 and the seat frame assembly 240 mounted to the floor assembly 220. A driver's seat assembly 410 and a driver's seatbelt assembly 440 are illustrated in the partially exploded view of FIG. 4 as being adapted for positioning in the operator cabin 232. The driver's seat assembly 410 includes a driver seat 412, a seat pedestal 414, a seat mount plate 416, a weldment plate 418, spacers 420, and fastener(s) 422. The driver's seatbelt assembly 440 includes a bulkhead mount 442, a seatbelt mount bracket 444, fastener(s) 446, and nut(s) 448.

In the illustrative embodiment, the floor assembly 220 (e.g., the main floor body 222) is formed to include a rectangular cavity 402 disposed in the operator cabin 232. In some embodiments, the cavity 402 may extend in the vertical direction VD through the floor assembly 220 to the chassis 210. The driver's seat 412 is coupled to and supported above the floor assembly 220 by the seat pedestal 414, and the seat pedestal 414 is mounted to the floor assembly 220 and/or the chassis 210 using the seat mount plate 416, the weldment plate 418, the spacers 420, and the fasteners 422. In the illustrative mounting arrangement, the spacers 420 are arranged between the seat mount plate 416 and the weldment plate 418 in the vertical direction VD. In some embodiments, when the seat assembly 410 is mounted in the cabin 232, one or more of the seat mount plate 416, the weldment plate 418, and the spacers 420 are at least partially positioned in the cavity 402. Additionally, in some embodiments, when the seat assembly 410 is mounted in the cabin 232, at least one component thereof (e.g., the weldment plate 418) indirectly or directly contacts the front suspension subframe assembly 310 of the chassis 210.

In the illustrative embodiment, the driver's seatbelt assembly 440 is adapted for securement to a bulkhead (not shown) at least partially positioned in the operator cabin 232. More specifically, the bulkhead mount 442 is configured for direct interaction and/or contact with the bulkhead and the seatbelt mount bracket 444 may be coupled to the bulkhead mount 442 using the fasteners 446 and the nuts 448. In some embodiments, the fasteners 446 may be identical or substantially identical to the fasteners 422. Additionally, in some embodiments, when the seatbelt assembly 440 is secured to the bulkhead, the seatbelt assembly 440 may be at least partially supported by the seatbelt tower assembly 230.

A rear bumper plate 404 is illustratively included in the rear bumper 208 as shown in FIG. 4A. The rear bumper plate 404 may be mounted to the chassis 210 (e.g., the electronics cradle assembly 390) using one or more fasteners 406 and one or more nuts 408. In the illustrative embodiment, a number of sensors configured for interaction with, and/or mounting to, the rear bumper plate 404 are omitted.

As shown in FIG. 4B, the crossbar assembly 324 is adapted to be coupled to the firewall assembly 322 using one or more fasteners 452 and one or more nuts 454. In some embodiments, when the crossbar assembly 324 is coupled to the firewall assembly 322, the assemblies 322, 324 are arranged beneath a hood (not shown) of a body of the vehicle 200. Additionally, in some embodiments, the assemblies 322, 324 may include, or otherwise provide, structural reinforcement features configured for deformation in response to impact forces applied proximate the front end 202 of the vehicle 200.

As shown in FIG. 4C, the illustrative vehicle 200 includes a fire extinguisher 460, a triangle kit 462, a mounting bracket 464, and one or more fasteners 466. In some embodiments, the fire extinguisher 460 is removably attached to the floor assembly 220 (e.g., the main floor body 222) such that the fire extinguisher 460 is arranged between the cavity 402 and the seatbelt tower assembly 230 in the longitudinal direction LD. Additionally, in some embodiments, the triangle kit 462 is removably mounted to the floor assembly 220 (e.g., the main floor body 222) using the mounting bracket 464 and the fasteners 466 such that the triangle kit 464 is arranged between the cavity 402 and the seatbelt tower assembly 230 in the longitudinal direction LD. Further, in some embodiments, when the fire extinguisher 460 and the triangle kit 462 are attached to the floor assembly 220, the fire extinguisher 460 and the triangle kit 462 are arranged in the vertical direction VD below the driver's seat assembly 410.

As shown in FIG. 4D, the illustrative vehicle 200 includes a plate 470 that may be coupled to a suitable structure using one or more rivets 472. In one example, the plate 470 may be coupled to a structure (e.g., the instrument panel assembly 318) arranged in the operator cabin 232. In another example, the plate 470 may be coupled to a structure of the floor assembly 220 (e.g., one of the step platforms 316 or one of the step supports 312, 314) and arranged in close proximity to the operator cabin 232. In yet another example, the plate 470 may be coupled to a structure of the chassis 210 (e.g., the front suspension subframe assembly 310) and arranged in close proximity to the operator cabin 232. Regardless, in some embodiments, the plate 470 may include vehicle identification information (e.g., the vehicle identification number (VIN)) for the vehicle 200.

As shown in FIG. 4E, the illustrative vehicle 200 includes a seatbelt mechanism 480 adapted for inclusion in the driver's seatbelt assembly 440. In one example, the seatbelt mechanism 480 may be directly coupled to the bulkhead mount 442 and/or the seatbelt mount bracket 444. In another example, the seatbelt mechanism 480 may be directly coupled to one or more structures included in the seatbelt tower assembly 230. In any case, in some embodiments, the seatbelt mechanism 480 includes, or is otherwise embodied as, a 3-point seat belt/lap belt mechanism.

Referring now to FIG. 5, the illustrative front suspension subframe assembly 310 includes a powertrain unit cradle 510 and a base block 530 coupled to the powertrain unit cradle 510 and arranged rearward of the powertrain unit cradle 510 in the longitudinal direction LD. The powertrain unit cradle 510 at least partially houses the powertrain unit 360 of the vehicle 200. The powertrain unit cradle 510 and the base block 530 are illustratively mounted to and supported by the base rails 1112, 1114.

The illustrative midframe assembly 370 includes support arm structures 570, 580 that are spaced apart from one another in the lateral direction LD'. As best seen in FIG. 9, when the vehicle 200 is assembled, the front suspension subframe assembly 310 is coupled to the midframe assembly 370 such that the base block 530 is arranged between the support arm structures 570, 580 in the lateral direction LD'. Additionally, when the vehicle 200 is assembled, the front suspension subframe assembly 310 is coupled to the midframe assembly 370 such that the base block 530 is aligned with the support arm structures 570, 580 in the longitudinal direction LD.

In some embodiments, when the front suspension subframe assembly 310 is coupled to the midframe assembly 370, the support arm structure 570 interfaces with, and may be directly coupled to, the base rail 1112. Additionally, in some embodiments, when the front suspension subframe assembly 310 is coupled to the midframe assembly 370, the support arm structure 580 interfaces with, and may be directly coupled to, the base rail 1114. In any case, in the illustrative embodiment, when the front suspension subframe assembly 310 is coupled to the midframe assembly 370, the base block 530 and the rails 1112, 1114 are at least partially received in a gap 572 extending in the lateral direction LD' between the support arm structures 570, 580.

As shown in FIG. 5, the illustrative vehicle 200 includes a variety of features in addition to the aforementioned devices, assemblies, and/or systems. Those features include, but are not limited to, the following: an oval trim piece 540 coupled to the crossbeam assembly 610 such that the trim piece 540 surrounds a central aperture 618 formed in the crossbeam assembly 610; a trim piece 544 at least partially disposed in the cage 1010 of the front suspension subframe assembly 310; a brake line connector 546 at least partially disposed in the cage 1010; one or more grommets 548; one or more fasteners 550; one or more fasteners 552 that may be distinguishable from the fasteners 550; one or more fasteners 554 that may be distinguishable from the fasteners 550, 552; one or more nuts 556; and one or more nuts 558 that may be distinguishable from the nuts 556.

Figure 6:
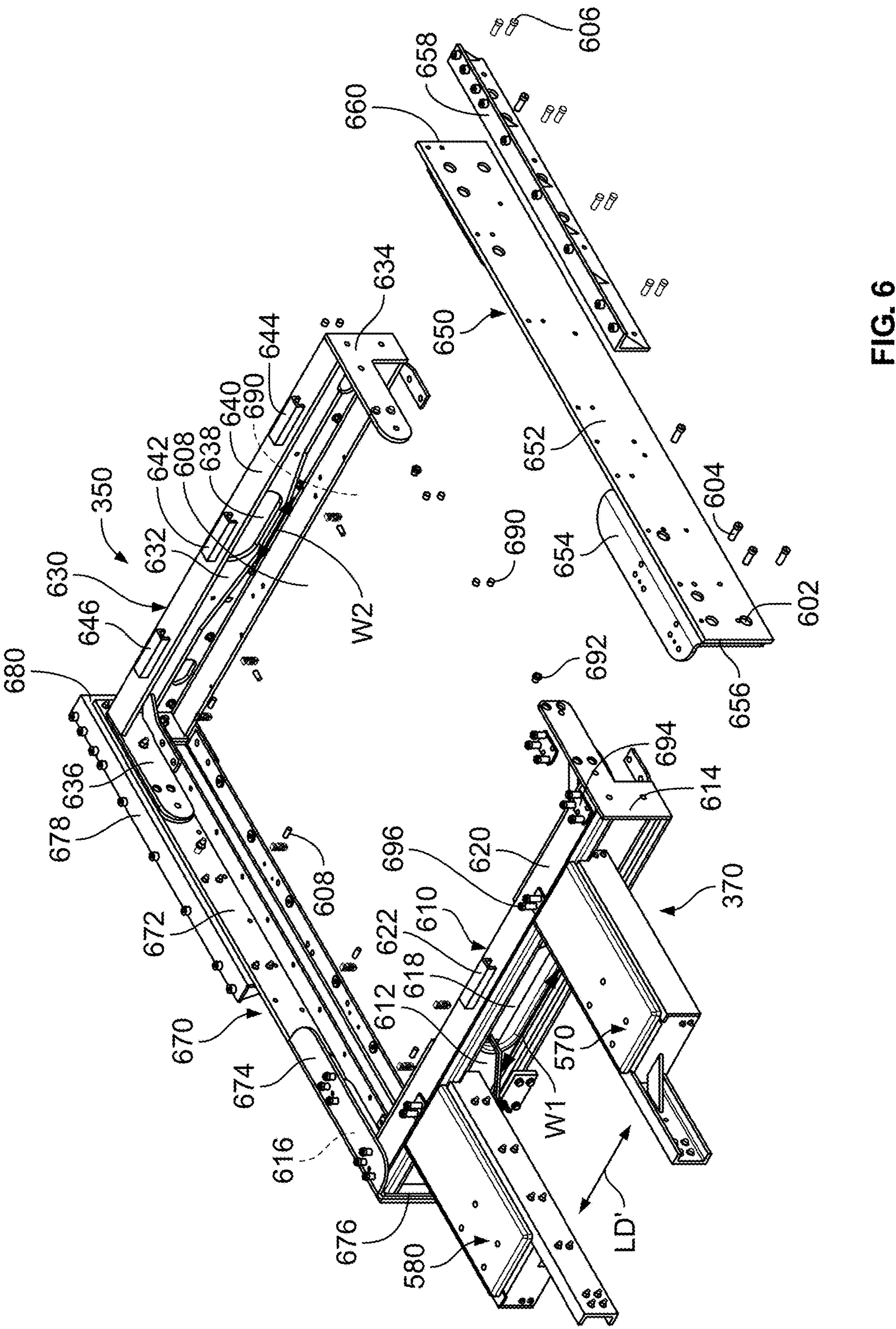
FIG. 6 is a perspective view of part of the chassis of FIG. 3A with certain features omitted for the sake of clarity that illustrates the midframe assembly coupled to various structures to at least partially define a power source cradle assembly.

Referring now to FIG. 6, in the illustrative embodiment, the support arm structures 570, 580 of the midframe assembly 370 are directly affixed to the crossbeam assembly 610 of the power source cradle assembly 350 which extends in the lateral direction LD' to couple the structures 570, 580 to one another. In some embodiments, the crossbeam assembly 610 may be said to at least partially define the midframe assembly 370. The crossbeam assembly 610, the crossbeam assembly 630, and the sidewall assemblies 650, 670 of the power source cradle assembly 350 are illustratively provided as separate structures coupled to one another to establish the enclosure 608. The illustrative enclosure 608 has a rectangular shape. Of course, in other embodiments, the enclosure 608 may take the shape of other suitable geometric forms.

In the illustrative embodiment, the crossbeam assemblies 610, 630 are structurally distinguishable from one another in at least one aspect. In other embodiments, however, the crossbeam assemblies 610, 630 may be identical or substantially identical to one another. Regardless, the illustrative crossbeam assemblies 610, 630 define opposite ends of the power source cradle assembly 350 in the longitudinal direction LD.

As shown in FIGS. 5 and 6, the illustrative crossbeam assembly 610 includes a main body panel 612 arranged to extend in the lateral direction LD' between mount brackets 614, 616 coupled to the main body panel 612 at opposite lateral sides thereof. The mount brackets 614, 616 extend in the longitudinal direction LD toward corresponding structures included in the crossbeam assembly 630. The mount bracket 614 and a corresponding structure of the crossbeam assembly 630 are directly affixed to a sidewall panel 652 of the sidewall assembly 650. The mount bracket 616 and a corresponding structure of the crossbeam assembly 630 are directly affixed to a sidewall panel 672 of the sidewall assembly 670.

The main body panel 612 of the crossbeam assembly 610 is formed to include the central aperture 618 extending therethrough that is located midway between the mount brackets 614, 616 in the lateral direction LD'. The aperture 618 has a width W1 in the lateral direction LD'. In the illustrative embodiment, an upwardly-facing surface 620 of the main body panel 612 in the vertical direction VD is coupled to a standoff bar 622. The standoff bar 622 is aligned with the central aperture 618 in the lateral direction LD'.

As shown in FIG. 6, the illustrative crossbeam assembly 630 includes a main body panel 632 arranged to extend in the lateral direction LD' between mount brackets 634, 636 coupled to the main body panel 632 at opposite lateral sides thereof. The mount brackets 634, 636 extend in the longitudinal direction LD toward corresponding mount brackets 614, 616 of the crossbeam assembly 610. The mount bracket 634 and the mount bracket 614 are directly affixed to the sidewall panel 652 of the sidewall assembly 650. The mount bracket 636 and the mount bracket 616 are directly affixed to the sidewall panel 672 of the sidewall assembly 670.

The main body panel 632 of the crossbeam assembly 630 is formed to include a central aperture 638 extending therethrough that is located midway between the mount brackets 634, 636 in the lateral direction LD'. The aperture 638 has a width W2 in the lateral direction LD' that is less than the width W1 of the aperture 618, at least in some embodiments. In the illustrative embodiment, an upwardly-facing surface 640 of the main body panel 632 in the vertical direction VD is coupled to standoff bars 642, 644, 646. The standoff bar 642 is aligned with the central aperture 638 in the lateral direction LD'. The standoff bars 644, 646 are arranged on opposite sides of the standoff bar 642.

In the illustrative embodiment, the sidewall assemblies 650, 670 are identical or substantially similar to one another. In other embodiments, however, the sidewall assemblies 650, 670 may be distinguishable from one another in at least one aspect. In any case, the illustrative sidewall assemblies 650, 670 define opposite exterior sides of the power source cradle assembly 350 in the lateral direction LD'.

The illustrative sidewall assembly 650 includes a sidewall panel 652 and a flap or tab 654 interconnected with the sidewall panel 652. The sidewall panel 652 has a rectangular shape and is arranged to extend in the vertical direction VD. The flap 654 is interconnected with the sidewall panel 652 such that the flap 654 extends in the lateral direction LD' (which may also be referred to as a horizontal direction) perpendicular or substantially perpendicular to the vertical direction VD. In the illustrative embodiment, the sidewall panel 652 is integral with or integrally formed with the flap 654. In other embodiments, the sidewall panel 652 and the flap 654 may be provided as separate structures that are coupled to one another.

The illustrative flap 654 is disposed at a forward end 656 of the sidewall assembly 650. The sidewall assembly 650 also includes a floor support bar 658 that is coupled to the sidewall panel 652 and positioned for direct contact with an overlying structure (e.g., the main floor body 222). In some embodiments, when coupled to the sidewall panel 652, the floor support bar 658 extends above the sidewall panel 652 in the vertical direction VD. In any case, the floor support bar 658 is disposed at a rear end 660 of the sidewall assembly 650 arranged opposite the forward end 656.

The illustrative sidewall assembly 670 includes a sidewall panel 672 and a flap or tab 674 interconnected with the sidewall panel 672. The sidewall panel 672 has a rectangular shape and is arranged to extend in the vertical direction VD. The flap 674 is interconnected with the sidewall panel 672 such that the flap 674 extends in the lateral direction LD' perpendicular or substantially perpendicular to the vertical direction VD. In the illustrative embodiment, the sidewall panel 672 is integral with or integrally formed with the flap 674. In other embodiments, the sidewall panel 672 and the flap 674 may be provided as separate structures that are coupled to one another.

The illustrative flap 674 is disposed at a forward end 676 of the sidewall assembly 670. The sidewall assembly 670 also includes a floor support bar 678 that is coupled to the sidewall panel 672 and positioned for direct contact with an overlying structure (e.g., the main floor body 222). In some embodiments, when coupled to the sidewall panel 672, the floor support bar 678 extends above the sidewall panel 672 in the vertical direction VD. In any case, the floor support bar 678 is disposed at a rear end 680 of the sidewall assembly 670 arranged opposite the forward end 676.

As shown in FIG. 6, the illustrative vehicle 200 includes a variety of features in addition to the aforementioned devices, assemblies, and/or systems. Those features include, but are not limited to, the following: one or more washers 602; one or more fasteners 604; one or more fasteners 606 that may be distinguishable from the fasteners 604; one or more fasteners 608 that may be distinguishable from the fasteners 604, 606; one or more nuts 690; one or more nuts 692 that may be distinguishable from the nuts 690; one or more weldments 694; and one or more weldments 696 that may be distinguishable from the weldments 694.

Referring now to FIG. 7, the crossbeam assembly 630 of the power source cradle assembly 350 is arranged adjacent to, and forward of, the rear suspension subframe assembly 330 in the longitudinal direction LD. As discussed above, the rear suspension subframe assembly 330 supports the pair of rear suspension assemblies 340A, 340B and the powertrain unit 380, and the suspension assemblies 340A, 340B and the powertrain unit 380 are likewise arranged rearward of the crossbeam assembly 630 in the longitudinal direction LD. The electronics cradle assembly 390 is arranged rearward of the rear suspension assemblies 340A, 340B and the powertrain unit 380 in the longitudinal direction LD.

As mentioned above, the rear suspension subframe assembly 330 includes the base plate 1410, the frame arch 1420, and the frame arch 1430. The rear suspension subframe assembly 330 also includes a faceplate 1440 that is coupled to the frame arches 1420, 1430 at respective forward ends 1422, 1432 thereof. An exterior side 1342 of the faceplate 1440 is arranged in confronting relation to the crossbeam assembly 630 and spaced from (e.g., arranged forward of) the base plate 1410 in the longitudinal direction LD. The base plate 1410 includes a central cavity 710 in which the powertrain unit 380 is at least partially positioned.

The cover plate 910 of the illustrative electronics cradle assembly 390 extends rearward of the base plate 1410 and at least a portion of each of the frame arch 1420 and the frame arch 1430 in the longitudinal direction LD. In the illustrative embodiment, the cover plate 910 is formed to include slots 720. The slots 720 include at least three slot rows 720A, 720B, 720C that are spaced from one another in the lateral direction LD'. In at least some embodiments, provision of the slots 720 in the cover plate 910 may facilitate dissipation of heat produced by electronic devices supported by the cradle assembly 390 in use thereof.

The illustrative electronics cradle assembly 390 includes two channel feet 730, 740 coupled to an underside 712 (shown in phantom) of the cover plate 910. The channel feel 730, 740 are spaced from one another in the lateral direction LD' when coupled to the cover plate 910. In the illustrative embodiment, each of the channel feet 730, 740 has a C-shaped cross-section.

As shown in FIG. 7, the illustrative vehicle 200 includes a variety of features in addition to the aforementioned devices, assemblies, and/or systems. Those features include, but are not limited to, the following: one or more wheel lug nuts 702; one or more washers 704; one or more fasteners 706; one or more nuts 708; one or more fasteners 714 that may be distinguishable from the one or more fasteners 706; and one or more nuts 716 that may be distinguishable from the one or more nuts 708.

Figure 8A:
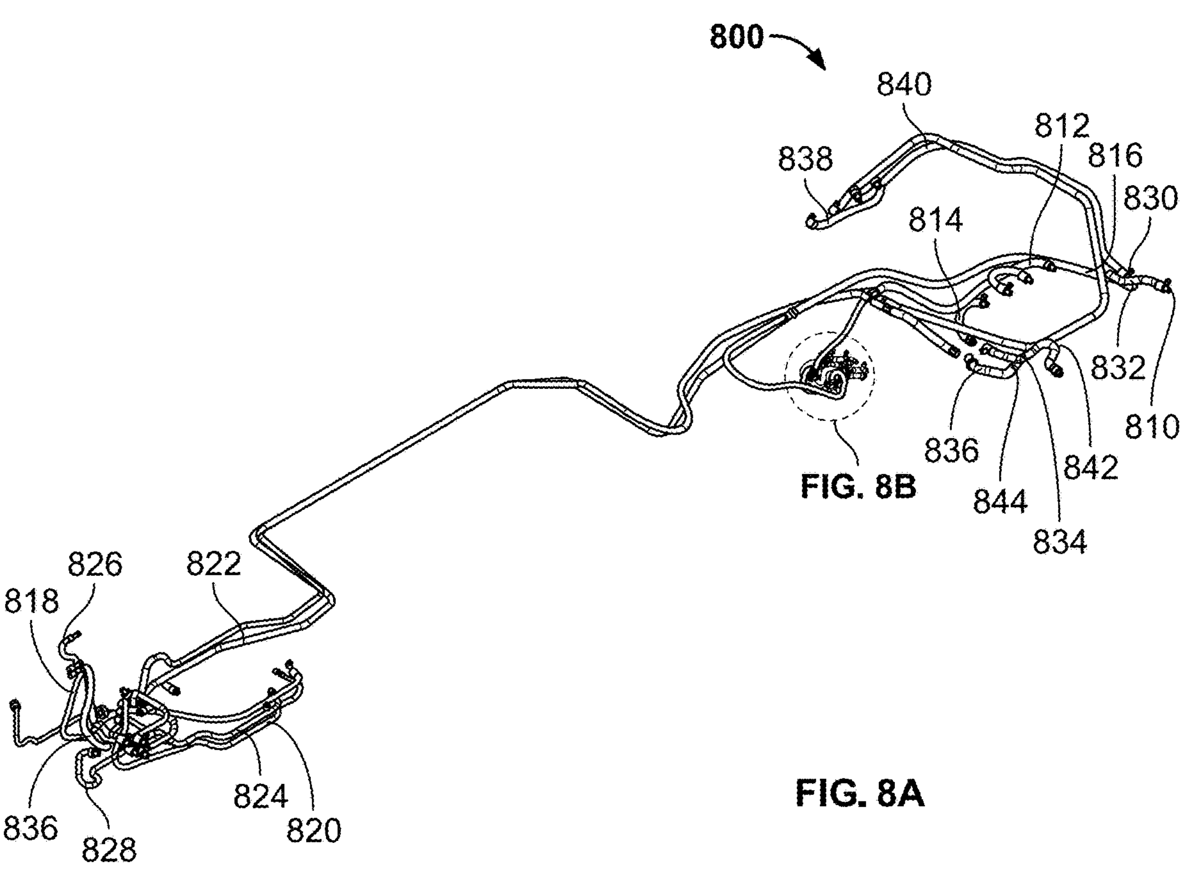
FIG. 8A is a perspective view of part of the chassis of FIG. 3A with certain features omitted for the sake of clarity that illustrates a collection of hoses or cables for supplying electrical power to various devices.

Referring now to FIG. 8A, the illustrative vehicle 200 includes a network 800 of components that may be used to deliver electrical power to various electronic devices of the vehicle 200. As discussed below, some components of the network 800 include, or are otherwise embodied as, electrical hoses, hose kits, cables, or segments thereof capable of delivering electrical power (e.g., power produced by the power sources 352) to various electronic devices of the vehicle 200. In some embodiments, the electrical hoses and/or cables included in the network 800 may be routed from the electronics cradle assembly 390 to electronic devices arranged in other sections of the multi-segment chassis 210, such as one or more electronic devices arranged in the front suspension subframe assembly 310, the rear suspension subframe assembly 330, the power source cradle assembly 350, and/or the midframe assembly 370, for example.

The illustrative network 800 includes a hose clamp 810, a hose or hose kit 812, a hose 814, a hose or hose kit 816, a hose or hose kit 818, a hose 820, a hose or hose kit 822, a hose or hose kit 824, a hose or hose kit 826, a hose 828, a fitting 830, a hose 832, a fitting 834, a hose 836, a hose 838, a hose 840, a hose 842, and a hose 844. It should be appreciated that each of the hoses or hose kits 812, 814, 816, 818, 820, 822, 824, 826, 828, 832, 836, 838, 840, 842, 844 may be routed in the longitudinal direction LD between the electronics cradle assembly 390 and one of more sections of the chassis 210 arranged forward of the cradle assembly 390. It should also be appreciated that when routed between the electronics cradle assembly 390 and one of more sections of the chassis 210 arranged forward thereof, each of the hoses or hose kits 812, 814, 816, 818, 820, 822, 824, 826, 828, 832, 836, 838, 840, 842, 844 may be retained and/or secured with one or more clamps (e.g., the hose clamp 810), ties, or the like. Further, it should be appreciated that the hoses or hose kits 812, 814, 816, 818, 820, 822, 824, 826, 828, 832, 836, 838, 840, 842, 844 may be coupled to one another with one or more fittings (e.g., the fittings 830, 834) and/or quick disconnect couplings.

Figure 8B:
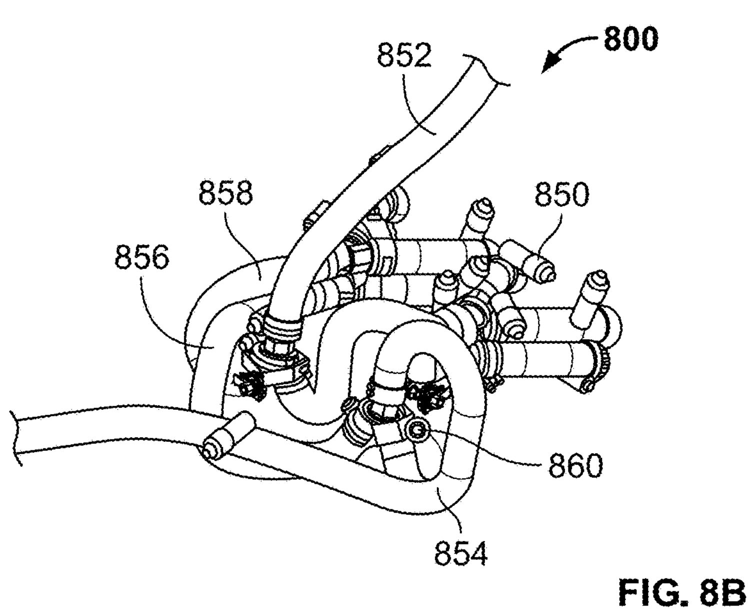
FIG. 8B is a magnified view of one portion of the collection of hoses of FIG. 8A.

Referring now to FIG. 8B, the illustrative network 800 includes a hose clamp 850, a hose 852, a hose 854, a hose 856, a hose 858, and a fitting 860. It should be appreciated that each of the hoses 852, 854, 856, 858 may be routed in the longitudinal direction LD between the electronics cradle assembly 390 and one of more sections of the chassis 210 arranged forward of the cradle assembly 390. It should also be appreciated that when routed between the electronics cradle assembly 390 and one of more sections of the chassis 210 arranged forward thereof, each of the hoses 852, 854, 856, 858 may be retained and/or secured with one or more clamps (e.g., the hose clamp 850), ties, or the like. Further, it should be appreciated that the hoses 852, 854, 856, 858 may be coupled to one another with one or more fittings (e.g., the fitting 860) and/or quick disconnect couplings.

Referring now to FIG. 9, the vehicle 200 is illustratively depicted with the multi-segment chassis 210 at least partially unobscured by the floor assembly 220. In the illustrative embodiment, the support arm structures 570, 580 of the midframe assembly 370, the flap 654 and the floor support bar 658 of the sidewall assembly 650 of the power source cradle assembly 350, and the flap 674 and the floor support bar 678 of the sidewall assembly 670 of the power source cradle assembly 350 are arranged in the longitudinal direction LD between the front wheels 212 and the rear wheels 214. The support arm structures 570, 580 are arranged inwardly in the lateral direction LD' relative to the flaps 654, 674. The flaps 654, 674 are arranged at least partially inwardly in the lateral direction LD' relative to the corresponding floor support bars 658, 678. The floor support bar 658 is disposed midway or substantially midway along the length L of the vehicle 200 in the longitudinal direction LD at an outermost lateral side 958 of the chassis 210. The floor support bar 678 is disposed midway or substantially midway along the length L of the vehicle 200 in the longitudinal direction LD at an outermost lateral side 978 of the chassis 210 that is opposite the side 958.

Figures 10, 11:
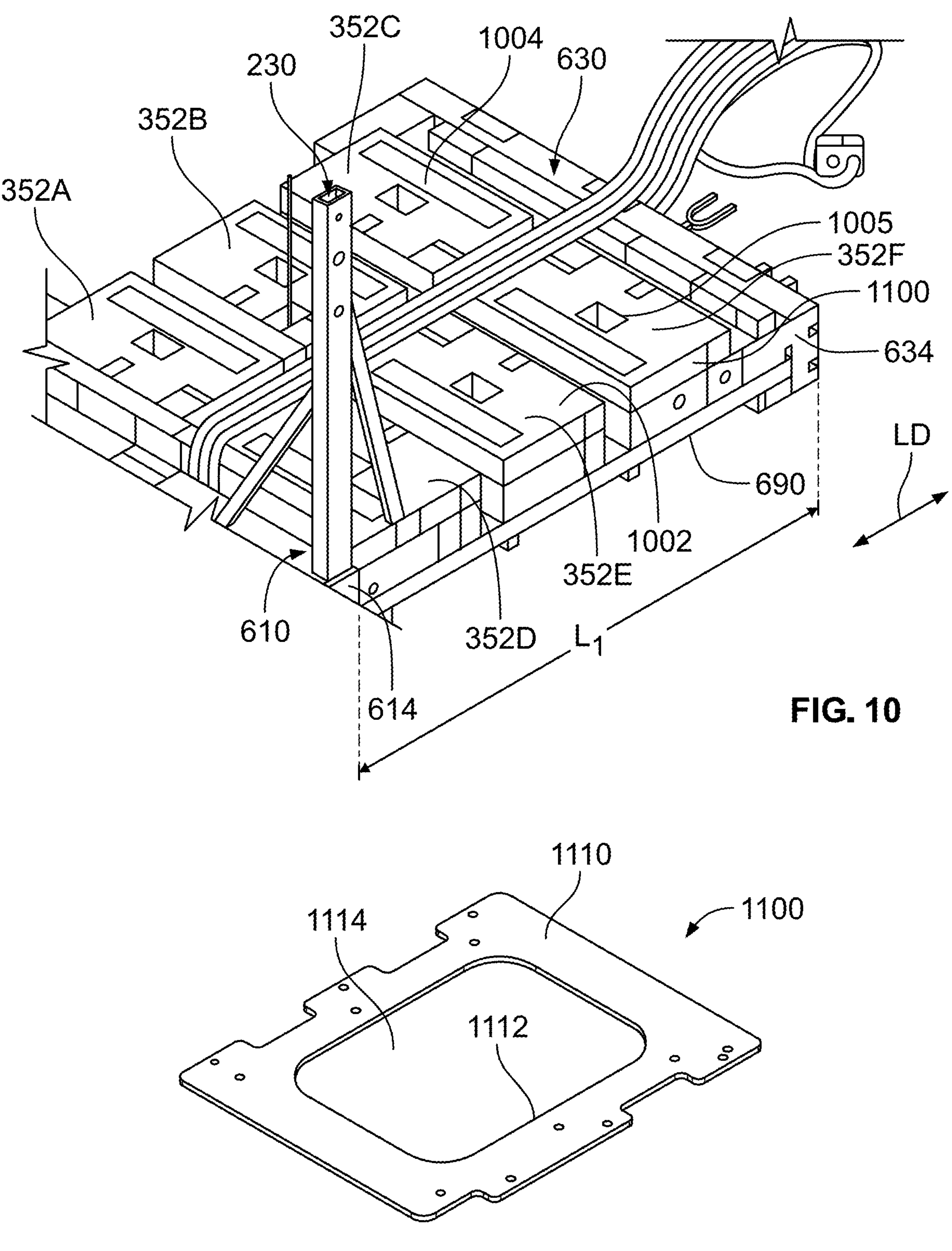
FIG. 10 is a perspective view of the power source cradle assembly of the chassis of FIG. 3A supporting a plurality of power sources for supplying electrical power to one or more electric motors of the vehicle.
FIG. 11 is a perspective view of a support tray that may be included in the power source cradle assembly of FIG. 10 for supporting at least one power source.

Referring now to FIGS. 10 and 11, the power source cradle assembly 350 is depicted partially assembled with at least one of the sidewall assemblies 650, 670 omitted. Electrical power sources (e.g., batteries) 352A, 352B, 352C, 352D, 352E, 352F are illustratively arranged in a space 1002 defined between the crossbeam assemblies 610, 630 in the longitudinal direction LD. It should be appreciated that the sidewall assemblies 650, 670 may be coupled to the crossbeam assemblies 610, 630 to at least partially close off the space 1002 and confine the power sources 352A, 352B, 352C, 352D, 352E, 352F in the enclosure 608.

In the illustrative embodiment, the power source cradle assembly 350 is sized to accommodate at least six power sources 352 in the enclosure 608. In the illustrative arrangement, the power sources 352A, 352B, 352C are arranged side-by-side in a row 1004 extending in the longitudinal direction LD, whereas the power sources 352D, 352E, 352F are arranged side-by-side in a row 1005 extending in the longitudinal direction LD. The rows 1004, 1005 are spaced from one another in the lateral direction LD'. In other embodiments, the power source cradle assembly 350 may include another suitable number of power sources 352 arranged in another suitable configuration in the enclosure 608.

In some embodiments, a floor plate 1020 is positioned in the space 1002 such that the floor plate 1020 is arranged beneath the power sources 352 in the vertical direction VD. The floor plate 1020 supports the power sources 352 arranged in the enclosure 608, at least in some embodiments. Additionally, in some embodiments, the floor plate 1020 extends continuously or substantially continuously from the crossbeam assembly 610 to the crossbeam assembly 630 in the longitudinal direction LD and/or spans an entire length L1 defined between the mount brackets 614, 634 of the respective crossbeam assemblies 610, 630 in the longitudinal direction LD. Further, in some embodiments still, the floor plate 1020 cooperates with the crossbeam assemblies 610, 630 and the sidewall assemblies 650, 670 to establish the plenum 690 in the enclosure 608.

In the illustrative embodiment, each of the power sources 352 is coupled to, and supported by, a support tray 1100. The support tray 1100 includes a tray base 1110 having an interior surface 1112 that defines a cavity 1114. The cavity 1114 has a generally rectangular shape with rounded corners. Of course, in other embodiments, the cavity 1114 may take the shape of other suitable geometric forms. In some embodiments, the cavity 1114 may at least partially conduct cooling air (e.g., cooling air supplied from the plenum 690) to the corresponding power source 352 to cool the power source 352.

In some embodiments, each support tray 1100 is arranged in the space 1002 between the corresponding power source 352 and the floor plate 1020 in the vertical direction VD. Additionally, in some embodiments, the arrangement of support trays 1100 in the space 1002 mirrors the arrangement of the power sources 352A, 352B, 352C, 352D, 352E, 352F in the space 1002 discussed above. As such, at least in those embodiments, at least six support trays 1100 may be accommodated in the enclosure 608 of the power source cradle assembly 350.

Figure 12:
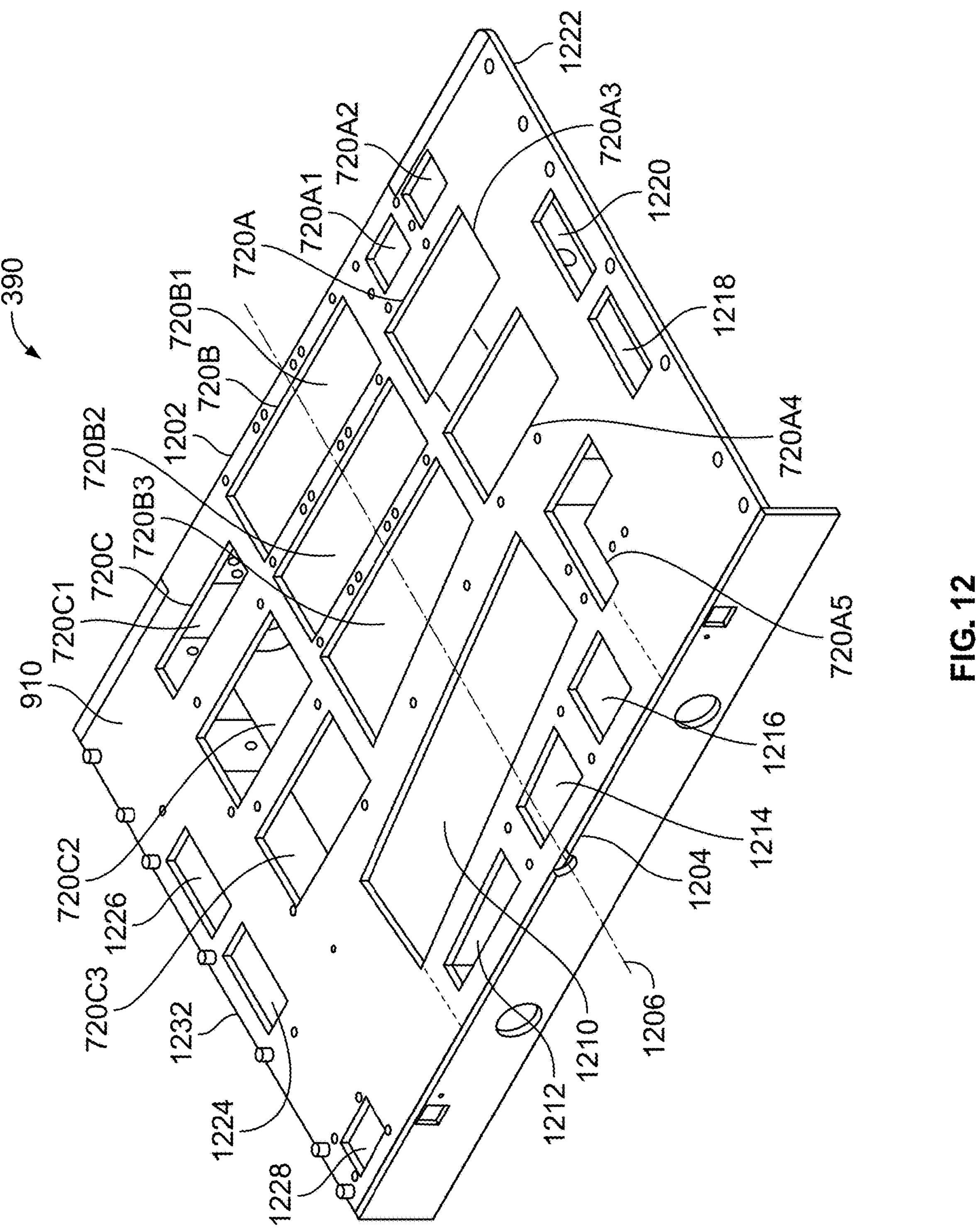
FIG. 12 is a perspective view of an electronics cradle assembly of the chassis of FIG. 3A adapted to support a plurality of electronic devices distinct from the plurality of power sources.

Referring now to FIG. 12, the illustrative cover plate 910 is formed to include various slots described in greater detail below that are arranged above various mechanical and/or electrical devices supported by the electronics cradle assembly 390 in the vertical direction VD. In some embodiments, provision of the slots improves airflow and facilitates cooling of mechanical and/or electrical devices supported by the electronics cradle assembly 390. Additionally, in some embodiments, provision of the slots reduces the surface area of the cover plate 910 to manage heat transfer to the cover plate 910.

The slots 720A formed in the cover plate 910 include a slot 720A1, a slot 720A2, a slot 720A3, a slot 720A4, and a slot 720A5. The slots 720A1, 720A2 are arranged beside one another such that the slots 720A1, 720A2 are aligned or substantially aligned in the longitudinal direction LD and spaced apart from one another in the lateral direction LD'. The slots 720A1, 720A2 are disposed closer to a front end 1202 of the cover plate 910 than each of the slots 720A3, 720A4, 720A5. The slots 720A1, 720A2 may be the same or substantially the same size. Each of the slots 720A1, 720A2 illustratively has a square shape. Of course, in other embodiments, it should be appreciated the slots 720A1, 720A2 may take the shape of other suitable geometric forms.

The illustrative slot 720A3 is aligned or substantially aligned with the slots 720A1, 720A2 in the lateral direction LD'. The width of the slot 720A3 in the lateral direction LD' is greater than the widths of each of the slots 720A1, 720A2 in the lateral direction LD'. Additionally, the length of the slot 720A3 in the longitudinal direction LD is greater than the lengths of each of the slots 720A1, 720A2 in the longitudinal direction LD. The slot 720A3 is disposed closer to a rear end 1204 of the cover plate 910 than each of the slots 720A1, 720A2. The slot 720A3 illustratively has a rectangular shape. Of course, in other embodiments, it should be appreciated the slot 720A3 may take the shape of other suitable geometric forms.

The illustrative slot 720A4 is aligned or substantially aligned with the slot 720A3 in the lateral direction LD'. The width of the slot 720A4 in the lateral direction LD' is the same or substantially the same as the width of the slot 720A3 in the lateral direction LD'. Additionally, the length of the slot 720A4 in the longitudinal direction LD is the same or substantially the same as the length of the slot 720A3 in the longitudinal direction LD. The slot 720A4 is disposed closer to the rear end 1204 of the cover plate 910 than the slot 720A3. The slot 720A4 illustratively has a rectangular shape. Of course, in other embodiments, it should be appreciated the slot 720A4 may take the shape of other suitable geometric forms.

The illustrative slot 720A5 is aligned or substantially aligned with the slot 720A4 in the lateral direction LD'. The slot 720A5 is disposed closer to the rear end 1204 of the cover plate 910 than each of the slots 720A1, 720A2, 720A3, 720A4. The slot 720A5 defines an L-shape. Of course, in other embodiments, it should be appreciated the slot 720A5 may take the shape of other suitable geometric forms.

The slots 720B formed in the cover plate 910 include a slot 720B1, a slot 720B2, and a slot 720B3. The slots 720B1, 720B2, 720B3 are aligned or substantially aligned in the lateral direction LD'. The slot 720B 1 is disposed closer to the front end 1202 of the cover plate 910 than each of the slots 720B2, 720B3, whereas the slot 720B3 is disposed closer to the rear end 1204 of the cover plate 910 than each of the slots 720B1, 720B2. The slots 720B1, 720B2 may be the same or substantially the same size. Whereas the slots 720B1, 720B2 illustratively have a rectangular shape, the slot 720B3 has a trapezoidal shape. Of course, in other embodiments, it should be appreciated the slots 720B1, 720B2, 720B3 may take the shape of other suitable geometric forms.

In the illustrative embodiment, each of the slots 720B1, 720B2, 720B3 has a width in the lateral direction LD' that is greater than the width of each of the slots 720A3, 720A4 in the lateral direction LD'. Additionally, in the illustrative embodiment, each of the slots 720B1, 720B2, 720B3 lies on a midline 1206 of the cover plate 910 in the lateral direction LD'.

The slots 720C formed in the cover plate 910 include a slot 720C1, a slot 720C2, and a slot 720C3. The slots 720C1, 720C2, 720C3 are aligned or substantially aligned in the lateral direction LD'. The slot 720C1 is disposed closer to the front end 1202 of the cover plate 910 than each of the slots 720C2, 720C3, whereas the slot 720C3 is disposed closer to the rear end 1204 of the cover plate 910 than each of the slots 720C1, 720C2. The slots 720C2, 720C3 may be the same or substantially the same size, while the slot 720C1 may have a length in the longitudinal direction LD that is less than the length of each of the slots 720C2, 720C3 in the longitudinal direction LD. The illustrative slots 720C1, 720C2, 720C3 each have a rectangular shape. Of course, in other embodiments, it should be appreciated the slots 720C1, 720C2, 720C3 may take the shape of other suitable geometric forms.

In the illustrative embodiment, each of the slots 720C1, 720C2, 720C3 has a width in the lateral direction LD' that is less than the width of each of the slots 720B1, 720B2, 720B3 in the lateral direction LD'. Each of the illustrative slots 720C1, 720C2, 720C3 has a width in the lateral direction LD' that is the same or substantially the same as the width of the slots 720A3, 720A4 in the lateral direction LD'. In the illustrative embodiment, the slots 720C1, 720C2, 720C3 are arranged opposite the slots 720A1, 720A2, 720A3, 720A4, 720A5 in the lateral direction LD' relative to the midline 1206.

The illustrative cover plate 910 includes a slot 1210. The slot 1210 is illustratively arranged on the midline 1206 closer to the rear end 1204 of the cover plate 910 than the front end 1202 of the cover plate 910. As such, the slot 1210 is at least partially aligned with the slots 720B1, 720B2, 720B3 in the lateral direction LD'. The slot 1210 has a width in the lateral direction LD' that is greater than (i) the widths of the slots 720A3, 720A4 in the lateral direction LD', (ii) the widths of the slots 720B1, 720B3, 720B3 in the lateral direction LD', and (iii) the widths of the slots 720C1, 720C2, 720C3 in the lateral direction LD'. In the illustrative embodiment, the slot 1210 has the shape of a parallelogram. Of course, in other embodiments, it should be appreciated the slot 1210 may take the shape of another suitable geometric form.

The cover plate 910 illustratively includes slots 1212, 1214, 1216. Each of the slots 1212, 1214, 1216 is disposed in the longitudinal direction LD between the slot 1210 and the rear end 1204 of the cover plate 910. The slot 1214 is illustratively arranged on the midline 1206 and partially aligned with the slots 1210, 720B1, 720B2, 720B3 in the lateral direction LD'. The slot 1212 is arranged opposite the slot 1216 in the lateral direction LD' relative to the midline 1206. The slot 1212 has a width in the lateral direction LD' that is greater than the width of each of the slots 1214, 1216 in the lateral direction LD'. Each of the slots 1212, 1214, 1216 illustratively has a trapezoidal shape. Of course, in other embodiments, it should be appreciated the slots 1212, 1214, 1216 may take the shape of other suitable geometric forms.

The illustrative cover plate 910 includes slots 1218, 1220 arranged adjacent a lateral side 1222 of the cover plate 910. More specifically, the slots 1218, 1220 are disposed between the slots 720A3, 720A4, 720A5 and the lateral side 1222 in the lateral direction LD'. In the illustrative embodiment, each of the slots 1218, 1220 has a rectangular shape. Of course, in other embodiments, it should be appreciated the slots 1218, 1220 may take the shape of other suitable geometric forms.

The illustrative cover plate 910 includes slots 1224, 1226 arranged adjacent a lateral side 1232 of the cover plate 910 that is disposed opposite the lateral side 1222. More specifically, the slots 1224, 1226 are disposed between the slots 720C1, 720C2, 720C3 and the lateral side 1232 in the lateral direction LD'. In the illustrative embodiment, each of the slots 1224, 1226 has a rectangular shape. Of course, in other embodiments, it should be appreciated the slots 1224, 1226 may take the shape of other suitable geometric forms.

The illustrative cover plate 910 includes a slot 1228. The slot 1228 is aligned or substantially aligned with the slots 1224, 1226 in the lateral direction LD'. Additionally, the slot 1228 is aligned or substantially aligned with the slots 1212, 1214, 1216 in the longitudinal direction LD. The slot 1228 is disposed in close proximity to the lateral side 1232 and the rear end 1204 of the cover plate 910. The slot 1228 illustratively has a square shape. Of course, in other embodiments, it should be appreciated the slot 1228 may take the shape of another suitable geometric form.

Figure 13:
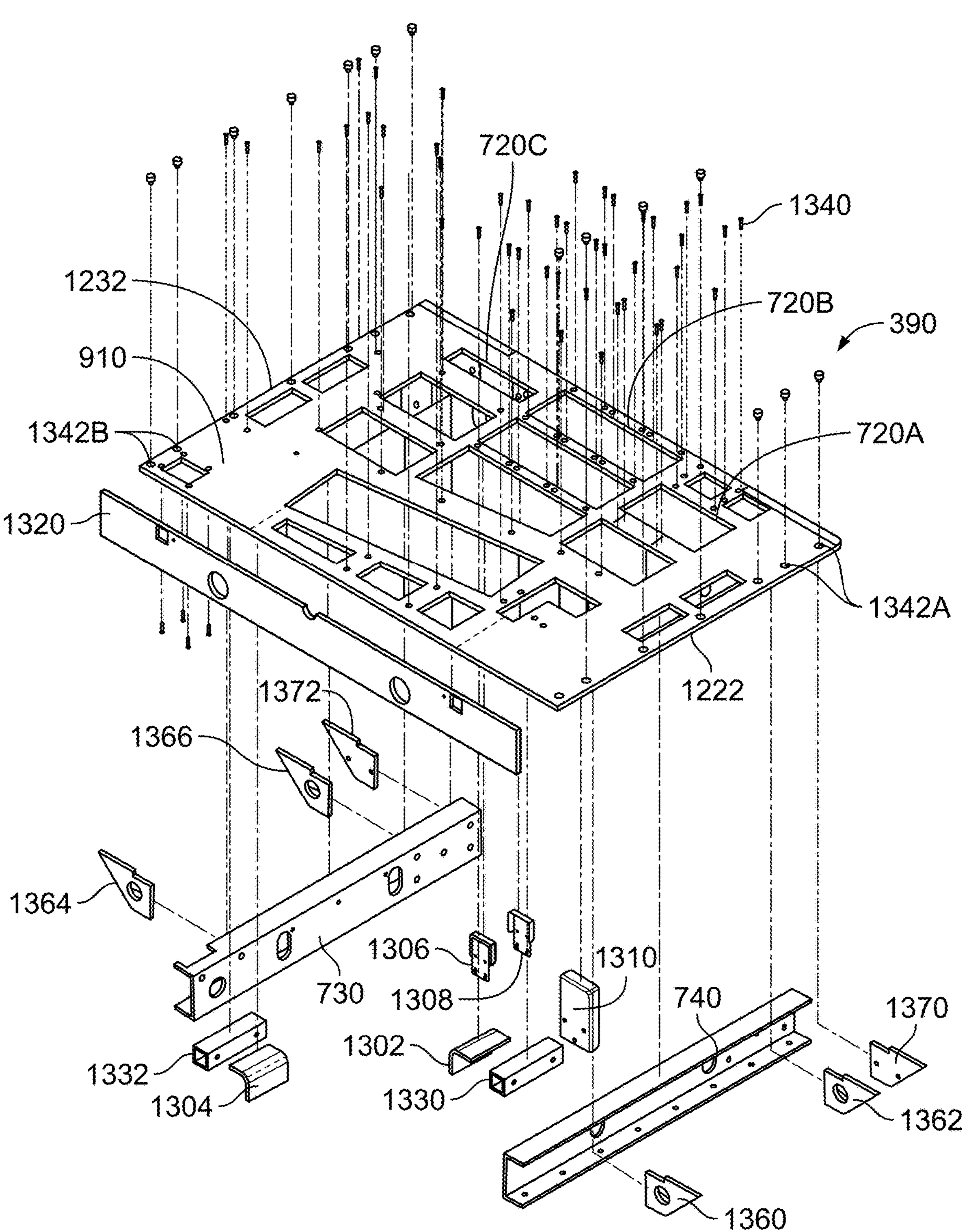
FIG. 13 is a partially exploded perspective view of the electronics cradle assembly shown in FIG. 12.
Figure 14:
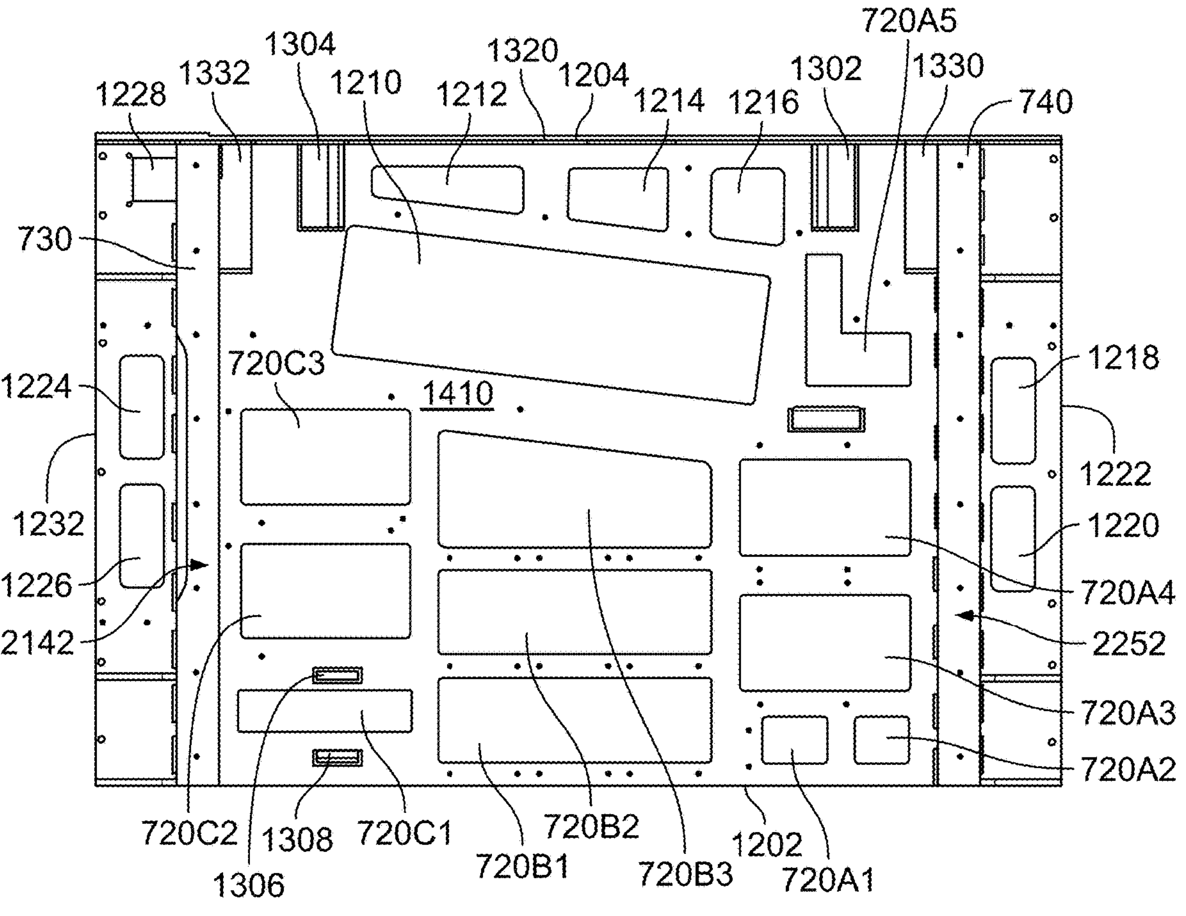
FIG. 14 is a bottom view of the electronics cradle assembly shown in FIG. 12.

Referring now to FIGS. 13-28, the illustrative electronics cradle assembly 390 includes brackets 1302, 1304 (see FIG. 13). In some embodiments, the brackets 1302, 1304 may be directly affixed to an underside 1410 (see FIG. 14) of the cover plate 910. Of course, in other embodiments, the brackets 1302, 1304 may be coupled to the cover plate 910 in another suitable manner. In any case, when the bracket 1302 is coupled to the cover plate 910 as shown in FIG. 14, the bracket 1302 is arranged in close proximity to the rear end 1204 of the cover plate 910 and disposed between the slot 1216 and the channel foot 740 in the lateral direction LD'. When the bracket 1304 is coupled to the cover plate 910 as shown in FIG. 14, the bracket 1304 is arranged in close proximity to the rear end 1204 of the cover plate 910 and disposed between the slot 1212 and the channel foot 730 in the lateral direction LD'.

In some embodiments, the bracket 1302 may cooperate with the channel foot 740 to at least partially contain and/or support one or more structures held by the electronics cradle assembly 390. In such embodiments, the structure(s) may be mounted to the bracket 1302 and/or the channel foot 740. Additionally, in some embodiments, the bracket 1304 may cooperate with the channel foot 730 to at least partially contain and/or support one or more structures held by the electronics cradle assembly 390. In such embodiments, the structure(s) may be mounted to the bracket 1304 and/or the channel foot 730. In any case, in the illustrative embodiment, the brackets 1302, 1304 are identical or substantially identical to one another.

Figure 18:
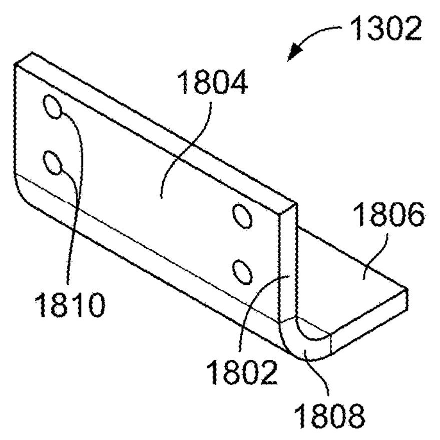
FIG. 18 is a perspective view of a bracket included in the electronics cradle assembly shown in FIG. 12.

As best seen in FIG. 18, the illustrative bracket 1302 includes, or is otherwise embodied as, an L-shaped bracket 1802. The L-shaped bracket 1802 includes bracket extensions 1804, 1806 arranged perpendicular or substantially perpendicular to one another and interconnected by a bend 1808. In the illustrative embodiment, the bracket extension 1804 is formed to include apertures 1810. In some embodiments, the apertures 1810 may be sized to receive fasteners (not shown) used to affix the bracket 1802 to the cover plate 910.

The illustrative electronics cradle assembly 390 includes mounts 1306, 1308 (see FIG. 13). In some embodiments, the mounts 1306, 1308 may be directly affixed to the underside 1410 of the cover plate 910. Of course, in other embodiments, the mounts 1306, 1308 may be coupled to the cover plate 910 in another suitable manner. In any case, when the mount 1306 is coupled to the cover plate 910 as shown in FIG. 14, the mount 1306 is arranged in close proximity to the front end 1202 of the cover plate 910 and disposed between the slot 720B1 and the channel foot 730 in the lateral direction LD'. When the mount 1308 is coupled to the cover plate 910 as shown in FIG. 14, the mount 1308 is arranged in closer proximity to the front end 1202 than the mount 1306 and disposed between the slot 720B1 and the channel foot 730 in the lateral direction LD'. The mounts 1306, 1308 are coupled to the cover plate 910 in alignment with one another in the lateral direction LD'. Whereas the mount 1308 is coupled to the cover plate 910 such that the mount 1308 is arranged between the front end 1202 and the slot 720C1 in the longitudinal direction LD, the mount 1306 is coupled to the cover plate 910 such that the mount 1306 is arranged between the slots 720C1, 720C2 in the longitudinal direction LD.

In some embodiments, the mounts 1306, 1308 may cooperate with one another to at least partially contain and/or support one or more structures held by the electronics cradle assembly 390, such as one or more pumps, for example. Additionally, in some embodiments, the mounts 1306, 1308 may individually contain and/or support the structure(s). In any case, in the illustrative embodiment, the brackets 1306, 1308 are identical or substantially identical to one another.

Figure 19:
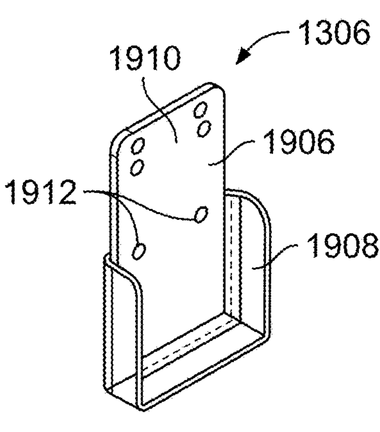
FIG. 19 is a perspective view of a pump mount included in the electronics cradle assembly shown in FIG. 12.

As best seen in FIG. 19, the illustrative mount 1306 includes, or is otherwise embodied as, a pump mount 1906. The pump mount 1906 includes a mount enclosure 1908 and a spine 1910 interconnected with the mount enclosure 1908 that extends outwardly away from the mount enclosure 1908. In some embodiments, when one or more structures are mounted using the pump mount 1906, the structure(s) contact the spine 1910 and are at least partially surrounded and/or enclosed by the mount enclosure 1908. In the illustrative embodiment, the spine 1910 is formed to include apertures 1912. In some embodiments, the apertures 1912 may be sized to receive fasteners (not shown) used to affix the mount 1906 to the cover plate 910.

The illustrative electronics cradle assembly 390 includes at least one mount 1310 (see FIG. 13) distinct from the mounts 1306, 1308. In some embodiments, the mount 1310 may be directly affixed to the underside 1410 of the cover plate 910. Of course, in other embodiments, the mount 1310 may be coupled to the cover plate 910 in another suitable manner. In any case, when the mount 1310 is coupled to the cover plate 910 as shown in FIG. 14, the mount 1310 is disposed between the slots 720A4, 720A5 in the longitudinal direction LD and at least partially aligned with the slots 720A3, 720A4, 720A5 in the lateral direction LD'.

In some embodiments, the mount(s) 1310 may cooperate with one another or another proximate structure to at least partially contain and/or support one or more structures held by the electronics cradle assembly 390, such as one or more air dryers, for example. Additionally, in some embodiments, the mount(s) 1310 may individually contain and/or support the structure(s). In any case, in the illustrative embodiment, the mount(s) 1310 are identical or substantially identical to one another.

As best seen in FIG. 20, the illustrative mount 1310 includes, or is otherwise embodied as, an air dryer mount 2010. The air dryer mount 2010 includes a mount housing 2012 and a back wall 2014 interconnected with the mount housing 2012. In some embodiments, when one or more structures are mounted using the air dryer mount 2010, the structure(s) contact the back wall 2014 and are at least partially surrounded and/or enclosed by the mount housing 2012. In the illustrative embodiment, the back wall 2014 is formed to include apertures 2016. In some embodiments, the apertures 2016 may be sized to receive fasteners (not shown) used to affix the mount 2010 to the cover plate 910.

The illustrative electronics cradle assembly 390 includes the channel foot 730 coupled to the underside 1410 of the cover plate 910 such that the channel foot 730 extends parallel to the longitudinal direction LD along an entire length thereof as shown in FIGS. 13 and 14. The illustrative channel foot 730 extends in the longitudinal direction LD all the way or substantially all the way between the front and rear ends 1202, 1204 of the cover plate 910 along the underside 1410 thereof, as best seen in FIG. 14. The channel foot 730 is illustratively coupled to the underside 1410 such that the channel foot 730 is disposed between the slots 720C1, 720C2, 720C3 and the slots 1224, 1226 in the lateral direction LD'. The channel foot 730 may be directly affixed to the underside 1410 of the cover plate 910 or coupled to the cover plate 910 in another suitable manner.

As best seen in FIG. 21, the illustrative channel foot 730 has a C-shaped cross section defined by a back panel 2130 and a pair of extensions 2140, 2142 interconnected with, and arranged perpendicular to, the back panel 2130. Using the extension 2140 as an example, the extension 2140 extends from a rear end 2144 to an opposite front end 2146. In close proximity to the rear end 2144, the extension 2140 is formed to include a rectangular notch 2148. In some embodiments, while the extension 2142 may be devoid of a notch aligned with the notch 2148, the extensions 2140, 2142 may be substantially similar otherwise. In the illustrative embodiment, the back panel 2130 is formed to include holes 2132, 2134, 2136 that are spaced from one another in the longitudinal direction LD. The back panel 2130 may also include apertures 2138 sized to receive fasteners (not shown) that are used to attach various structures to the channel foot 730 in use of the electronics cradle assembly 390.

The illustrative electronics cradle assembly 390 includes the channel foot 740 coupled to the underside 1410 of the cover plate 910 such that the channel foot 740 extends parallel to the longitudinal direction LD along an entire length thereof as shown in FIGS. 13 and 14. The illustrative channel foot 740 extends in the longitudinal direction LD all the way or substantially all the way between the front and rear ends 1202, 1204 of the cover plate 910 along the underside 1410 thereof, as best seen in FIG. 14. The channel foot 740 is illustratively coupled to the underside 1410 such that the channel foot 740 is disposed between the slots 720A3, 720A4, 720A5 and the slots 1218, 1220 in the lateral direction LD'. The channel foot 740 may be directly affixed to the underside 1410 of the cover plate 910 or coupled to the cover plate 910 in another suitable manner.

As best seen in FIG. 22, the illustrative channel foot 740 has a C-shaped cross section defined by a back panel 2240 and a pair of extensions 2250, 2252 interconnected with, and arranged perpendicular to, the back panel 2240. Using the extension 2250 as an example, the extension 2250 extends from a rear end 2254 to an opposite front end 2256. In some embodiments, the extensions 2250, 2252 may be identical or substantially identical to one another. In the illustrative embodiment, the back panel 2240 is formed to include holes 2242, 2244 that are spaced from one another in the longitudinal direction LD. The back panel 2240 may also include apertures 2246 sized to receive fasteners (not shown) that are used to attach various structures to the channel foot 740 in use of the electronics cradle assembly 390. As best seen in FIG. 13, when the channel feet 730, 740 are coupled to the underside 1410 of the cover plate 910, the respective back panels 2130, 2240 are arranged in confronting relation to one another.

The illustrative cover plate 910 of the electronics cradle assembly 390 extends in the longitudinal direction LD between the front and rear ends 1202, 1204 and in the lateral direction LD' between the lateral sides 1222, 1232 as shown in FIGS. 13 and 23. The aforementioned slots of the cover plate 910 extend all the way through the cover plate 910 from a top side 2310 to the underside 1410. The cover plate 910 may also include apertures 2312 sized to receive fasteners (not shown) that are used to attach various structures to the cover plate 910 in use of the electronics cradle assembly 390.

The illustrative electronics cradle assembly 390 includes a cover flap 1320 coupled to the underside 1410 of the cover plate 910 along the rear end 1204 thereof. In some embodiments, the cover flap 1320 may at least partially close off an interior compartment located beneath the top side 2310 in the vertical direction VD along the rear end 1204 of the cover plate 910. As best seen in FIG. 24, the cover flap 1320 includes, or is otherwise embodied as, a rectangular flap

2420 extending between opposite ends 2422, 2424 and between opposite edges 2426, 2428.

The flap 2420 illustratively includes a semicircular notch 2430 formed in the edge 2426 and disposed substantially midway between the ends 2422, 2424. The flap 2420 also includes a bore 2432 arranged between the notch 2430 and the end 2422 and a rectangular slot 2434 arranged between the bore 2432 and the end 2422. The flap 2420 also includes a bore 2442 arranged between the notch 2430 and the end 2424 and a rectangular slot 2444 arranged between the bore 2442 and the end 2424.

Figure 15:
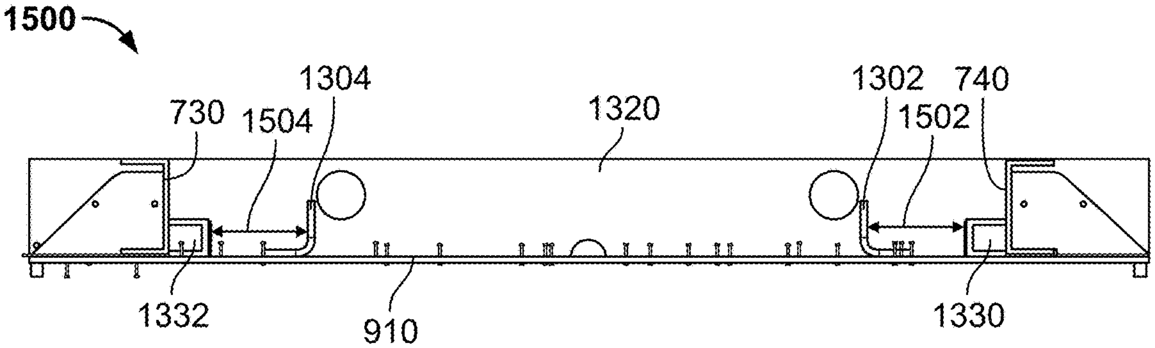
FIG. 15 is an end elevation view of the electronics cradle assembly shown in FIG. 12.

The illustrative electronics cradle assembly 390 includes bars 1330, 1332 (see FIG. 13). In some embodiments, as shown in FIGS. 14 and 15, the bars 1330, 1332 may be directly affixed to the underside 1410 of the cover plate 910. Of course, in other embodiments, the bars 1330, 1332 may be coupled to the cover plate 910 in another suitable manner. In any case, when the bar 1330 is coupled to the cover plate 910 as shown in FIG. 14, the bar 1330 is arranged in close proximity to the rear end 1204 in the longitudinal direction LD and disposed between the bracket 1302 and the channel foot 740 in the lateral direction LD'. Additionally, when the bar 1332 is coupled to the cover plate 910 as shown in FIG. 14, the bar 1332 is arranged in close proximity to the rear end 1204 in the longitudinal direction LD and disposed between the bracket 1304 and the channel foot 730 in the lateral direction LD'. In any case, in the illustrative embodiment, the bars 1330, 1332 are identical or substantially identical to one another.

In some embodiments, as best seen in FIG. 15, the bar 1330 may be coupled to the cover plate 910 such that the bar 1330 abuts, and is in direct contact with, the channel foot 740. In that arrangement, the bar 1330 and the bracket 1302 are spaced apart from one another by a distance 1502 in the lateral direction LD'. Additionally, in some embodiments, as best seen in FIG. 15, the bar 1332 may be coupled to the cover plate 910 such that the bar 1332 abuts, and is in direct contact with, the channel foot 730. In that arrangement, the bar 1332 and the bracket 1304 are spaced apart from one another by a distance 1504 in the lateral direction LD'. In some embodiments, the distances 1502, 1504 are equal or substantially equal to one another.

As best seen in FIG. 26, the illustrative bar 1330 includes, or is otherwise embodied as, a rectangular bar 2630 defining an interior space 2632. Of course, in other embodiments, it should be appreciated that the bar 1330 may take the shape of other suitable geometric forms. In the illustrative embodiment, the bar 2630 is formed to include apertures 2634 sized to receive fasteners (not shown) that may be used to attach the bar 2630 to the channel foot 740 in use of the electronics cradle assembly 390.

The illustrative electronics cradle assembly 390 includes spacers 1340 each sized for receipt in a corresponding hole 1342 extending through the cover plate 910. In some embodiments, a first set of holes 1342A are aligned with one another in the lateral direction LD' and disposed in close proximity to the lateral side 1222 of the cover plate 910. The first set of holes 1342A are spaced from one another in the longitudinal direction LD and arranged to receive a first set of spacers 1340. Additionally, in some embodiments, a second set of holes 1342B are aligned with one another in the lateral direction LD' and disposed in close proximity to the lateral side 1232 of the cover plate 910. The second set of holes 1342B are spaced from one another in the longitudinal direction LD and arranged to receive a second set of spacers 1340. In the illustrative embodiment, the spacers 1340 are identical or substantially identical to one another.

As best seen in FIG. 25, the illustrative spacer 1340 includes, or is otherwise embodied as, a generally cylindrical spacer 2540 having sections with different diameters. More specifically, the spacer 2540 illustratively includes a section 2542 having a first diameter and a section 2544 coupled to the section 2542 that has a second diameter. In the illustrative embodiment, the diameter of the section 2542 is greater than the diameter of the section 2544.

Figure 16:
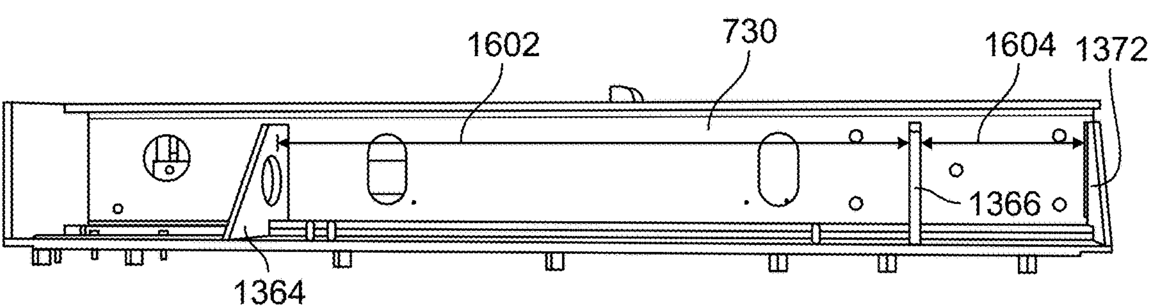
FIG. 16 is a side elevation view of the electronics cradle assembly shown in FIG. 12.
Figure 17:
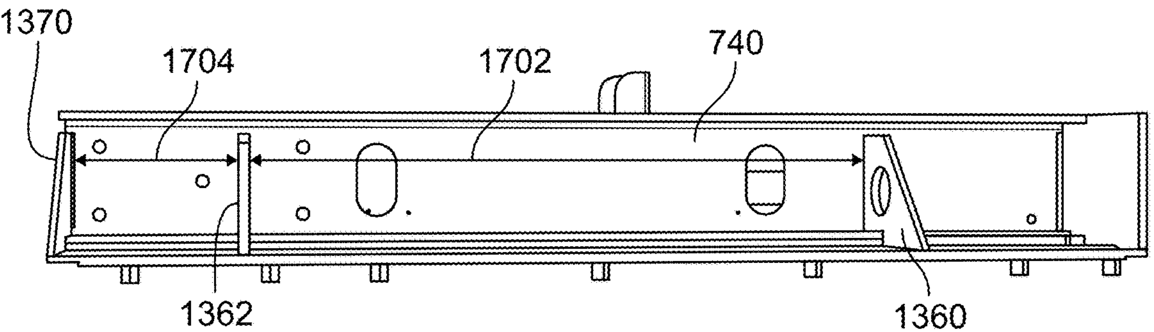
FIG. 17 is another side elevation view of the electronic cradle assembly shown in FIG. 12.

The illustrative electronics cradle assembly 390 includes dividers or weldments 1360, 1362, 1364, 1366 as shown in FIG. 13. In the illustrative embodiment, the dividers 1360, 1362, 1364, 1366 are identical or substantially identical to one another. The dividers 1360, 1362 are affixed to the channel foot 740 whereas the dividers 1364, 1366 are affixed to the channel foot 730. Interaction between the dividers 1364, 1366 and the channel foot 730 is depicted in FIG. 16 whereas interaction between the dividers 1360, 1362 and the channel foot 740 is depicted in FIG. 17. In any case, in the illustrative arrangement, the dividers 1360, 1362, 1364, 1366 are disposed beneath the cover plate 910 in the vertical direction VD.

The dividers 1364, 1366 are coupled to the channel foot 730 as shown in FIG. 16 so that the dividers 1364, 1366 are spaced apart by a distance 1602 in the longitudinal direction LD. The dividers 1360, 1362 are coupled to the channel foot 740 as shown in FIG. 17 so that the dividers 1360, 1362 are spaced apart by a distance 1702 in the longitudinal direction LD. In some embodiments, the distances 1602, 1702 are equal to one another or substantially equal to one another. Additionally, in some embodiments, when the dividers 1364, 1366 are coupled to the channel foot 730 and the dividers 1360, 1362 are coupled to the channel foot 740, the dividers 1362, 1366 are aligned or substantially aligned in the longitudinal direction LD and the dividers 1360, 1364 are aligned or substantially aligned in the longitudinal direction LD.

As best seen in FIG. 28, the illustrative divider 1360 includes, or is otherwise embodied as, a generally trapezoidal divider 2860. The divider 2860 is formed to include a rectangular notch 2862 and a bore 2864. In the orientation of the divider 2860 depicted in FIG. 13, the notch 2862 faces upwardly in the vertical direction VD.

The illustrative electronics cradle assembly 390 includes dividers or weldments 1370, 1372 as shown in FIG. 13. The dividers 1370, 1372 are distinct from the dividers 1360, 1362, 1364, 1366. In the illustrative embodiment, the dividers 1370, 1372 are identical or substantially identical to one another. The divider 1370 is affixed to the channel foot 740 whereas the divider 1372 is affixed to the channel foot 730. Interaction between the divider 1372 and the channel foot 730 is depicted in FIG. 16 whereas interaction between the divider 1370 and the channel foot 740 is depicted in FIG. 17. In any case, in the illustrative arrangement, the dividers 1370, 1372 are disposed beneath the cover plate 910 in the vertical direction VD.

The divider 1372 is coupled to the channel foot 730 as shown in FIG. 16 such that the divider 1372 is spaced from the divider 1366 by a distance 1604 in the longitudinal direction LD. The divider 1370 is coupled to the channel foot 740 as shown in FIG. 17 such that the divider 1370 is spaced from the divider 1362 by a distance 1704 in the longitudinal direction LD. In some embodiments, the distances 1604, 1704 are equal to one another or substantially equal to one another. Additionally, in some embodiments, when the divider 1370 is coupled to the channel foot 740 and the divider 1372 is coupled to the channel foot 730, the dividers 1370, 1372 are aligned or substantially aligned in the longitudinal direction LD.

As best seen in FIG. 27, the illustrative divider 1370 includes, or is otherwise embodied as, a generally trapezoidal divider 2770. The divider 2770 is formed to include a rectangular notch 2772. In the illustrative embodiment, the divider 2770 is devoid of a bore like the bore 2864. In the orientation of the divider 2770 depicted in FIG. 13, the notch 2772 faces upwardly in the vertical direction VD.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An electric vehicle comprising:

a chassis extending in a longitudinal direction, and a plurality of wheels supported by the chassis including a pair of front wheels and a pair of rear wheels arranged rearward of the pair of front wheels in the longitudinal direction, wherein the chassis includes a power source cradle assembly supporting a plurality of power sources of the vehicle that is arranged between the pair of front wheels and the pair of rear wheels in the longitudinal direction, wherein the power source cradle assembly comprises a first crossbeam assembly disposed at a forward end of the power source cradle assembly that extends in a lateral direction perpendicular to the longitudinal direction and includes a first aperture, a second crossbeam assembly disposed at a rearward end of the power source cradle assembly opposite the forward end that extends in the lateral direction and includes a second aperture, a first sidewall assembly disposed at one lateral end of the power source cradle assembly that extends in the longitudinal direction to couple the first crossbeam assembly and the second crossbeam assembly, and a second sidewall assembly disposed at another lateral end of the power source cradle assembly opposite the one lateral end that extends in the longitudinal direction to couple the first crossbeam assembly and the second crossbeam assembly, wherein the first aperture and the second aperture are in fluid communication with an open space extending in the longitudinal direction from the first crossbeam assembly to the second crossbeam assembly, and wherein the first crossbeam assembly, the second crossbeam assembly, the first sidewall assembly, and the second sidewall assembly are aligned in a vertical direction.

2. The electric vehicle of claim 1, wherein the first aperture and the second aperture are aligned in the lateral direction and arranged on a longitudinal centerline of the power source cradle assembly.

3. The electric vehicle of claim 1, wherein the first aperture has a first width in the lateral direction and the second aperture has a second width in the lateral direction that is less than the first width.

4. The electric vehicle of claim 1, wherein:

the first crossbeam assembly, the second crossbeam assembly, the first sidewall assembly, and the second sidewall assembly cooperatively establish an enclosure in which the plurality of power sources are at least partially enclosed, the enclosure defines the open space, and the open space extends in the lateral direction from the first sidewall assembly to the second sidewall assembly.

5. The electric vehicle of claim 1, wherein:

the chassis includes a midframe assembly arranged at least partially between the pair of front wheels and at least a portion of the power source cradle assembly in the longitudinal direction, the midframe assembly includes a pair of support arm structures spaced apart from one another in the lateral direction, and the first crossbeam assembly extends in the lateral direction to couple the pair of support arm structures to one another.

6. The electric vehicle of claim 5, wherein the first aperture is arranged midway between the pair of support arm structures in the lateral direction.

7. An electric vehicle comprising:

a chassis extending in a longitudinal direction, and a plurality of wheels supported by the chassis including a pair of front wheels and a pair of rear wheels arranged rearward of the pair of front wheels in the longitudinal direction, wherein the chassis includes a power source cradle assembly supporting a plurality of power sources of the vehicle that is arranged between the pair of front wheels and the pair of rear wheels in the longitudinal direction, and wherein the power source cradle assembly comprises a first crossbeam assembly disposed at a forward end of the power source cradle assembly that extends in a lateral direction perpendicular to the longitudinal direction, a second crossbeam assembly disposed at a rearward end of the power source cradle assembly opposite the forward end that extends in the lateral direction, and a first sidewall assembly including a first sidewall panel extending in a vertical direction, a first flap interconnected with the first sidewall panel such that the first flap extends in a horizontal direction perpendicular to the vertical direction, and a floor support bar coupled to the first sidewall panel and positioned for interaction with an overlying floor of the vehicle.

8. The electric vehicle of claim 7, wherein the first sidewall panel is integral with the first flap.

9. The electric vehicle of claim 7, wherein the first flap is disposed at a forward end of the first sidewall assembly.

10. The electric vehicle of claim 7, wherein the first flap is disposed at a forward end of the first sidewall assembly and the floor support bar is disposed rearward of the first flap.

11. The electric vehicle of claim 7, wherein the floor support bar has an L-shaped cross-section.

12. An electric vehicle comprising:

a chassis extending in a longitudinal direction, and a plurality of wheels supported by the chassis including a pair of front wheels and a pair of rear wheels arranged rearward of the pair of front wheels in the longitudinal direction, wherein the chassis includes (i) a power source cradle assembly supporting a plurality of power sources of the vehicle that is arranged between the pair of front wheels and the pair of rear wheels in the longitudinal direction and (ii) an electronics cradle assembly supporting a plurality of electronic devices of the vehicle that is arranged rearward of the pair of rear wheels in the longitudinal direction and extends to a rear bumper of the vehicle, and wherein the electronics cradle assembly includes a cover plate extending from a forward end of the electronics cradle assembly to the rear bumper to at least partially cover the plurality of electronic devices and a cover flap coupled to an underside of the cover plate along a rear end of the cover plate such that the cover flap is arranged adjacent the rear bumper.

13. The electric vehicle of claim 12, wherein the cover flap is arranged perpendicular to the cover plate.

14. The electric vehicle of claim 12, wherein the electronics cradle assembly comprises:

a cover plate extending from a forward end of the electronics cradle assembly to the rear bumper to at least partially cover the plurality of electronic devices, and at one channel foot coupled to an underside of the cover plate that has a C-shaped cross-section.

15. The electric vehicle of claim 14, wherein the at least one channel foot comprises a pair of channel feet spaced from one another in a lateral direction perpendicular to the longitudinal direction.

16. The electric vehicle of claim 14, wherein the electronics cradle assembly comprises a plurality of dividers coupled to the at least one channel foot along the underside of the cover plate.

17. The electric vehicle of claim 16, wherein the plurality of dividers comprise three dividers.

* * * * *